(12) United States Patent
Kapellner et al.

(10) Patent No.: US 7,128,420 B2
(45) Date of Patent: Oct. 31, 2006

(54) IMAGE PROJECTING DEVICE AND METHOD

(75) Inventors: Yuval Kapellner, Bat Yam (IL); Sharon Kapellner, Bat-Yam (IL); Itzhak Pomerantz, Kefar-Saba (IL); Zeev Zalevsky, Rosh HaAyin (IL); Eran Sabo, Netania (IL)

(73) Assignee: Explay Ltd., Bat-Yam (IL)

( * ) Notice: Subject to any disclaimer, the term of this patent is extended or adjusted under 35 U.S.C. 154(b) by 0 days.

(21) Appl. No.: 10/482,928

(22) PCT Filed: Jul. 8, 2002

(86) PCT No.: PCT/IB02/02616

§ 371 (c)(1),
(2), (4) Date: Jul. 19, 2004

(87) PCT Pub. No.: WO03/005733

PCT Pub. Date: Jan. 16, 2003

(65) Prior Publication Data

US 2004/0239880 A1    Dec. 2, 2004

(51) Int. Cl.
*G03B 21/14* (2006.01)
*G03B 21/20* (2006.01)

(52) U.S. Cl. ............ 353/38; 353/20; 353/102

(58) Field of Classification Search ........ 353/20, 353/30, 31, 99, 102, 119, 38
See application file for complete search history.

(56) References Cited

U.S. PATENT DOCUMENTS

| | | | |
|---|---|---|---|
| 5,136,390 A | 8/1992 | Inova et al. | 358/231 |
| 5,398,125 A | 3/1995 | Willett et al. | 359/41 |
| 5,508,834 A * | 4/1996 | Yamada et al. | 349/58 |
| 5,517,263 A | 5/1996 | Minich et al. | 353/31 |
| 5,704,700 A | 1/1998 | Kappel et al. | 353/31 |
| 5,777,789 A | 7/1998 | Chiu et al. | 359/494 |
| 5,971,545 A | 10/1999 | Haitz | 353/31 |
| 5,975,703 A | 11/1999 | Holman et al. | 353/20 |
| 6,122,023 A | 9/2000 | Chen et al. | 349/86 |
| 6,183,092 B1 | 2/2001 | Troyer | 353/31 |
| 2002/0018157 A1* | 2/2002 | Zhang et al. | 349/43 |

FOREIGN PATENT DOCUMENTS

| | | |
|---|---|---|
| EP | 0 425 266 A2 | 5/1991 |
| JP | 60 262131 A | 12/1985 |
| JP | 11 313346 A | 11/1999 |

* cited by examiner

*Primary Examiner*—Melissa Jan Koval
(74) *Attorney, Agent, or Firm*—Browdy and Neimark, PLLC

(57) ABSTRACT

An image projecting device is presented. The device comprises an SLM pixel arrangement; and two lens arrays. The lens arrays are respectively located at opposite surfaces of the SLM pixel arrangement and are integral with the SLM pixel arrangement, forming together with the SLM pixel arrangement a common SLM unit. Each lens in one array and a respective opposite lens in the other array are associated with a corresponding one of the pixels. Each of the lens arrays is implemented in a polymer spacer and is either spaced from the corresponding surface of the opposite surfaces of the pixel arrangement a distance substantially not exceeding 50 μm or is in physical contact with the respective surface. The device also comprises a light source system operable to produce an incident light beam of a predetermined cross section corresponding to the size of an active surface of the SLM pixel arrangement; and a magnification optics.

42 Claims, 18 Drawing Sheets

IMAGE PROJECTING DEVICE AND METHOD

FIELD OF THE INVENTION

This invention relates to a compact-size image projecting device and method.

BACKGROUND OF THE INVENTION

Microdisplays are miniaturized displays, typically with a screen size of less than 1.5" diagonal. Microdisplays are commonly used in data projectors, head mounted displays, and in the traditional viewfinders of digital cameras. Microdisplays can be implemented within compact projectors, in viewfinders of handheld Internet appliances and in mobile phones for Web surfing and videoconferences, because full computer screens can be viewed.

Most microdisplays use a light-valve made of a silicon chip as the substrate material. The chip also houses the addressing electronics (at least an active matrix with integrated drivers), usually implemented in standard CMOS technology which allows very reliable and stable circuits, as well as very small pixel pitches (down to 10 μm or even somewhat smaller), as well as high display resolutions.

There are known reflective and transmissive light valves. Reflective light valves bounce light off the displayed image into the viewer's lens or the projection lens. Transmissive light valves are similar to backlit, portable computer screens using LCD (Liquid Crystal Display) and EL (electro-lumination) technologies. Common reflective light valves are based on Liquid Crystal On Silicon (LCOS) and tilted micro-mirrors (DMD). Common transmissive light valves are based on Active-Matrix Liquid Crystal Displays (AM-LCD).

Projectors that use transmitting microdisplays as mentioned above typically comprise an optical path that includes a light source and a Spatial Light Modulator (SLM), in which a beam shaping optic component as well as a polarizing component are disposed between them. Another polarizing component and a magnifying optic component are generally disposed between the SLM and the projection surface. The SLM is coupled to a video processing driver to produce the image modulation of the light according to an input signal.

Common optical difficulties in the design of known projectors based on microdisplay are: low energy efficiency; low brightness and non-uniformity of the output image due to the source non-uniform intensity distribution (i.e. Gaussian distribution over the SLM surface) and intensity losses; low focus depth of the output image. In laser based projectors, the "speckle" phenomena of a Laser source according to which, a granular pattern of light pervade the image, is also a technical difficulty. Other common difficulties directly related to the optical difficulties and to the hardware implementation are: size, weight, optical complexity, power consumption and the mobility of the overall projecting device.

Different methods and devices addressed to overcome one or more of the above-mentioned difficulties are disclosed by the following.

U.S. Pat. No. 5,971,545 discloses a compact and energy efficient projection display utilizing a reflective light valve. The output beams of the light sources are received by at least one spatial light modulator. The modulated output beams are collimated and combined. A projection lens receives the collimated and combined output beams and directs them towards a projection screen. Energy efficiency is achieved by using sequentially strobed RGB light sources instead of a white light source.

U.S. Pat. No. 5,777,789 discloses an optical system for high-resolution projection display, consisting of reflection birefringent (double refractive) light valves. The LCD projector comprises a polarizing beam splitter, color image combining prisms, illumination system, projection lens, filters for color and contrast control, and a screen. The illumination system includes a light source such as a metal-halide arc lamp, an ultraviolet and infrared filter or filters positioned in the optical path from the light source for filtering out the infrared and ultraviolet light emitted from the light source, a light tunnel for providing uniform light intensity, and a relay lens system for magnifying the illumination system output plane and imaging said plane onto the liquid crystal light valves.

U.S. Pat. No. 5,975,703 discloses an image projection device having an SLM and a polarized source system. The optical system uses polarized light manipulated by at least one of a conicoid, or plane optical elements to effect a folded mirror system to project an image onto a screen by utilizing input light components of more than one state of polarization, thus reducing intensity losses over the optical system due to polarization filtering. The system supplies light components of substantially orthogonal polarizations for separate areas of the SLM to be output onto a projection screen.

U.S. Pat. No. 6,183,092 discloses a laser projector which includes a laser apparatus and a reflective liquid-crystal light valve capable of speckle suppression through beam-path displacement by deflecting the beam during projection, thereby avoiding both absorption and diffusion of the beam while preserving pseudocollimation (noncrossing rays). The latter, in turn, is important to infinite sharpness. Path displacement is achieved by scanning the beam on the light valves which also provides several enhancements—in energy efficiency, brightness, contrast, beam uniformity (by suppressing both laser-mode ripple and artifacts), and convenient beam-turning to transfer the beam between apparatus tiers. The deflection effect is performed by a mirror mounted on a galvanometer or motor for rotary oscillation; images are written incrementally on successive portions of the light valve control stage (either optical or electronic) while the laser "reading beam" is synchronized on the output stage. The beam is shaped, with very little energy loss to masking, into a shallow cross-section which is shifted on the viewing screen as well as the light valves. Beam-splitter/analyzer cubes are preferred over polarizing sheets. Spatial modulation provided by a light valve and maintained by pseudocollimation enables imaging on irregular projection media.

U.S. Pat. No. 5,517,263 discloses a compact size projection system which includes a bright light source of polarized light, and a spatial light modulator, having an alignment layer, to modulate the polarized projection light, wherein the bright polarized light source is aligned with the alignment layer to permit the polarized light to pass therethrough without the need for unwanted light blocking polarizers. The use of a polarized laser source together with its proper alignment with the light valve, enables substantially all of the laser light beams to be utilized by the SLM to form the projected image. Without the use of filters and/or polarizers with the light valve, the intensity losses of the laser optical output are thus reduced. Furthermore, the light emanating from a laser is polarized, and thus, there is no need for polarizing filters, which would otherwise reduce the laser light energy.

U.S. Pat. No. 5,704,700 discloses a laser illuminated and SLM-based projection system that includes a microlaser array coupled with a beam shaper to produce a bright (i.e. having a uniform intensity distribution) projection light beam to be impinged over the SLM. The beam shaper includes a binary phase plate, a microlens array arrangement or a diffuser arrangement to modify the shape and intensity profile of the projection light beam. The laser light illuminating the light valve thus has a uniform intensity distribution for projecting an extremely bright image, and is confined substantially to the pixel portion of the light valve.

SUMMARY OF THE INVENTION

There is a need in the art to facilitate projecting of images by providing a novel miniature projector device and method.

The device of the present invention is lightweight and highly efficient, and is capable of utilizing a high-ratio polarized light source, high-efficiency SLM performing digital processing of data to be imaged so as to significantly reduce the speckles' associated effects, as well as performing digital processing of a projected image to improve its uniformity.

According to one broad aspect of the present invention, there is provided an image projecting device comprising a light source system operable to produce an incident light beam of a predetermined cross section to be incident onto the active surface of a spatial light modulator (SLM) unit formed by an SLM pixel arrangement, said predetermined cross section of the incident beam corresponding to the size of said active surface; and a magnification optics accommodated at the output side of the SLM unit; the device being characterized in that said SLM unit comprises first and second lens arrays at opposite sides of the SLM pixel arrangement, such that each lens in the first array and a respective opposite lens in the second array are associated with a corresponding one of the SLM pixels.

The device of the present invention may utilize a transmissive SLM type that does not require polarization of the light, or alternatively may utilize an SLM of the kind operating with specifically polarized light. In the latter case, the device is designed so as to provide specific polarization of the SLM input and output light. This can be implemented by using a polarizer unit at the output of the SLM and either using an input polarizer or a light source of the kind generating high-ratio polarized light. The input polarizer may be part of the light source system or of the SLM unit.

The light source system may comprise an optical arrangement operable to provide substantially uniform intensity distribution within the cross-section of the incident light beam. This optical arrangement includes a diffractive element (commonly referred to as "top-hat") operable to modify the beam intensity distribution to produce the substantially uniform intensity distribution of the beam within its cross-section.

Preferably, if the use of polarized light is required, the light source used in the device of the present invention is of the kind generating a high-ratio polarized light beam (thereby eliminating the use of a polarizer at the input side of the SLM unit), and preferably also of the kind generating the light beam of the cross section substantially of the size of the active surface of the SLM unit (thus enabling the elimination of the beam shaping optics) or alternatively equipped with a beam shaping optics to provide the desired beam cross section.

According to another broad aspect of the present invention, there is provided an image projecting device comprising a light source system operable to produce a light beam to impinge onto an active surface of a spatial light modulator (SLM) unit formed by an SLM pixel arrangement, said incident light beam being linearly polarized, having a predetermined cross section corresponding to the size of said active surface; and a polarizer unit and a magnification optics accommodated at the output side of the SLM with respect to the direction of light propagation through the device, the device being characterized in that:

said light source system comprises a light source generating said linearly polarized light beam having the cross section substantially equal to the size of the active area of the SLM unit; and said SLM unit comprises first and second lens' arrays at opposite sides of an SLM pixel arrangement, such that each lens in the first array and a respective opposite lens in the second array are associated with a corresponding one of the SLM pixels.

Preferably, the above device also comprises a diffractive optics accommodated in the path of light propagating towards the SLM unit to provide substantially uniform intensity distribution of the incident light beam within said cross section.

Preferably, the device of the present invention comprises an image processor system (control unit) operable to carry out at least one of the following: applying digital processing to data indicative of an image to be projected so as to avoid or at least significantly reduce the speckle-associated effects in the projected image; processing of data indicative of the projected image to correct for non-uniformities in the light intensity; and analyzing data indicative of the environmental condition to adjust the intensity and/or the color mixture of the incident light beam.

Thus according to yet another aspect of the present invention, there is provided an image projecting device comprising a light source system operable to produce a light beam to impinge onto a active surface of a spatial light modulator (SLM) unit formed by an SLM pixel arrangement, said incident light beam being linearly polarized and having a predetermined cross section corresponding to the size of said active surface, and a polarizer unit and a magnification optics accommodated at the output side of the SLM with respect to the direction of light propagation through the device, the device being characterized in that it comprises an image processor system operable to carry out at least one of the following: (i) applying digital processing to data indicative of an image to be projected so as to reduce effects associated with creation of speckles in the projected image; (ii) processing of data indicative of the projected image to correct for non-uniformities in the light intensity; and (iii) analyzing data indicative of an environmental condition to adjust at least one of the intensity and color mixture of the incident light beam.

The device of the present invention may be operable to provide color images. This can be implemented by utilizing three separate SLM pixels each for at corresponding one of three primary colors, or by utilizing the same SLM pixels for all the primary colors, but providing time modulation of the color light components. The analysis of the data indicative of the environmental condition may alternatively or additionally be aimed at adjusting the color mixture of the incident light beam.

The device of the present invention can be used with any conventional video generating device to project images onto an external screen surface. The device can be operable to project the same image with two different angles of projection, thereby enabling observation of the same image by two different observers, and also allows for private operation of the respective one of the images by each of the observers through his viewing area.

The technique of the present invention allows for combining images projected by several micro-projectors of the present invention, thereby allowing the creation of a large combined image; projecting the image onto a concaved screen surface; and creation of stereoscopic images by using two micro-projectors or the single micro-projector equipped with a rotating mirror.

The present invention, according to its yet another aspect provides a method for projecting an image comprising:

(a) creating an incident light beam having a predetermined cross section corresponding to a size of an active surface of a spatial light modulator (SLM) unit formed by an SLM pixel arrangement and directing said incident light beam towards said active surface;

(b) passing said light through the SLM unit having first and second lens' arrays at opposite sides of the SLM pixel arrangement, each lens in the first array and a respective opposite lens in the second array being associated with a corresponding one of the SLM pixels, concurrently operating the SLM pixel arrangement with an imaging signal representative of an image to be projected;

(c) passing modulated light emerging from the SLM unit through a magnifying optics to be projected into a projecting surface.

BRIEF DESCRIPTION OF THE DRAWINGS

In order to understand the invention and to see how it may be carried out in practice, preferred embodiments will now be described, by way of non-limiting example only, with reference to the accompanying drawings, in which.

DETAILED DESCRIPTION OF THE INVENTION

Figure 1:
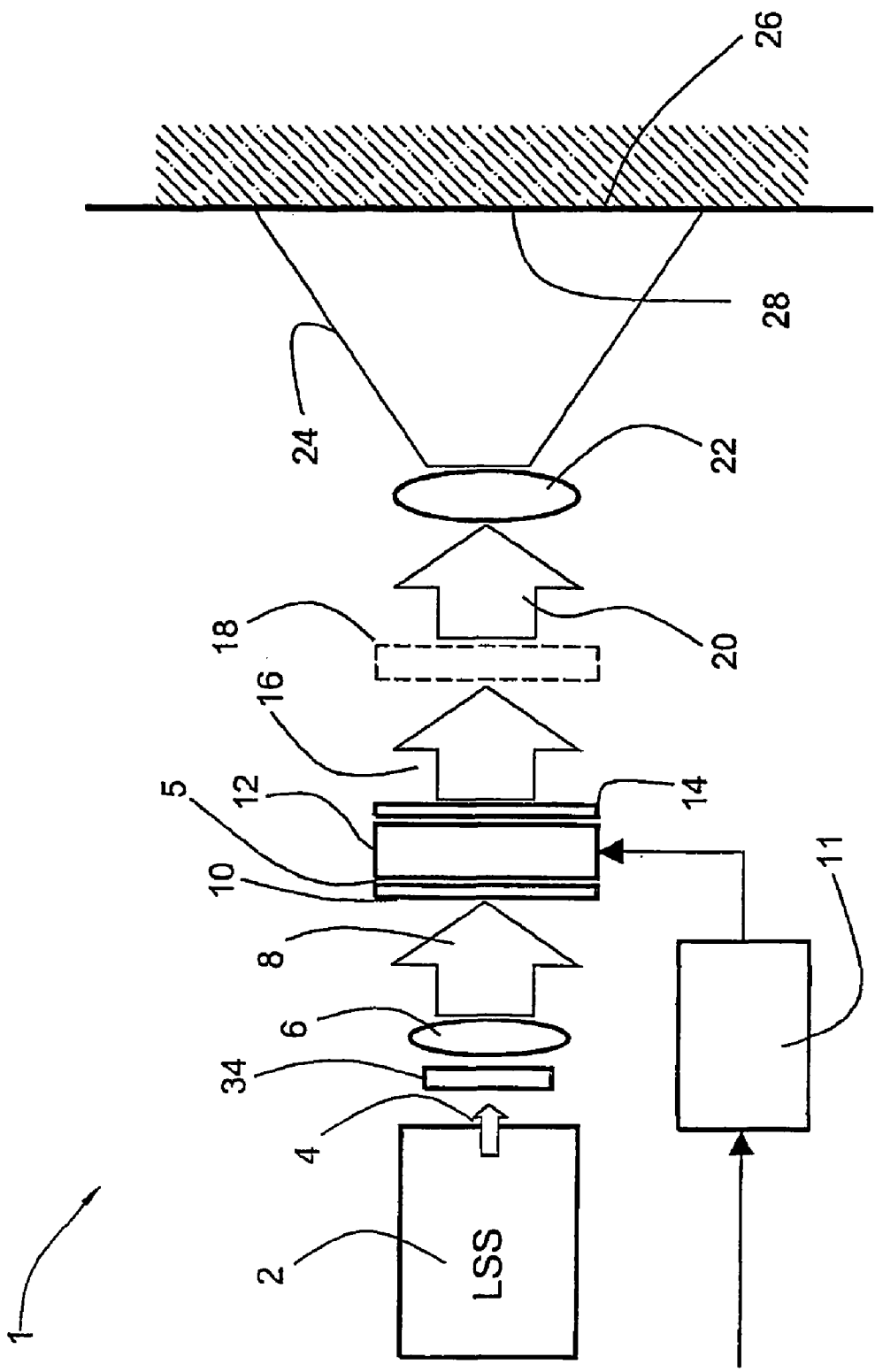
FIG. 1 is a schematic block diagram of a projecting device according to the invention showing the main optical components a light propagation scheme.

FIG. 1 is a schematic block diagram of a projecting device 1 according to the invention showing the optical components of a light propagation scheme. The device 1 comprises a light source system LSS including a light source 2 generating a collimated light beam 4, an optical arrangement including a diffractive element 34 ("top-hat") operable to affect the intensity distribution of the beam 4 to produce substantially uniform intensity distribution of the beam 4 within its cross section, and a beam shaping optics (beam expander) 6 that affects the cross section of the beam 4 to be substantially equal to the size of an active surface defined by a pixel arrangement 5 (the so-called "windowed structure") of an SLM unit 12 (such as the liquid crystal based SLM Module RS170 commercially available from Kopin Corporation, USA).

It should be noted that the provision of the beam expander 6 is optional, and the same effect can be achieved by providing an appropriate light source, for example, a laser diode/DPSS laser module with a beam diameter of 6 mm to cover the image modulation area on the SLM.

It should also be noted that the SLM unit may be of the king operating with randomly polarized light. Alternatively, the SLM unit may be of the kind operating with specifically polarized light. In this case, the light beam impinging onto the SLM pixel arrangement has a specific linear polarization, and the device comprises an output polarizer (analyzer) 18 shown in dashed lines since its provision is optional depending on the kind of SLM used in the device. The polarizer 18 has a preferred orientation of the plane of polarization either similar to that of the incident light beam 4 or 90°-rotated, and therefore blocks either the part of light that has been rotated by the SLM, or the part that has not been affected by the SLM. As for the polarization of the incident light beam, it is preferably achieved by using the light source of the kind generating high-ratio polarized light, but can, generally, be achieved by using a light source generating a randomly polarized light and using a separate polarizer (not shown) at the input side of the active surface 5. This input polarizer can be a part of the light source system, a part of the SLM unit, or can be a stand-alone unit accommodated between the light source and the SLM unit.

Thus, in the example of FIG. 1, the SLM is of the kind operating with polarized light, the light source generates high polarization ratio light, and the output polarizer is used. The term "high polarization ratio" is typically referred to as that of about 1:50, 1:100 polarized light or above, and can for example be achieved with a laser diode and DPSS laser modules, such as the GMC-532-XF5 laser module series commercially available from Lasemate Corporation USA.

The construction of the SLM pixel arrangement 5 is known in the art and therefore need not be specifically described except to note that it comprises a two-dimensional array of active cells (e.g., liquid crystal cells) each serving as a pixel of the image and being separately operated by a modulation driver 11 to be ON or OFF and to perform the polarization rotation of light impinging thereon, thereby enabling to provide a corresponding gray level of the pixel. Some of the cells are controlled to let the light pass therethrough without a change in polarization, while others are controlled to rotate the polarization of light by certain angles, according to the input signal from the driver 11.

The SLM unit 12 further comprises a first lenslet array 10 at the input side of the pixel arrangement and a second lenslet array 14 at the output side of the pixel arrangement. Practically, the lenslet arrays can be integral with the pixel arrangement being mounted onto the opposite surfaces thereof. The construction and operation of the SLM unit with lenslet arrays will be described more specifically further below with reference to FIGS. 3A–3B and 4A–4C. The lenslet array is a two-dimensional array of miniature lenses that matches the array of active cells of the SLM, such that each lens from the array 10 and the respective opposite lens from the array 14 are associated with the corresponding one of the active cells. The lenslet array 10 thus clusters the light beam 8 to correspond to the image modulation area within the active surface 5 of the SLM elements by splitting the light beam impinging thereon into a plurality of components and focusing each component by the respective lenslet to the respective pixel (i.e. each lenslet corresponds to a single pixel), thus improving the light efficiency of the process.

Thus, the incident light beam (e.g., linearly polarized light beam) of the substantially uniform intensity distribution 4 is expanded resulting in a beam 8 with the cross section substantially equal to the size of the active surface of the SLM. The beam 8 passes through the lenslet array 10 resulting in the clustered light that passes through the SLM pixel arrangement and is modulated in accordance with the image to be projected. The modulated light emerging from the SLM is collected by the second lenslet array 14, that cancels the clustering effect of the first lenslet array 10, thus producing a beam 16 having a uniform cross section as that of the beam 8 before passing through the first lenslet array 10. The operation of the SLM unit will be described more specifically further below with reference to FIGS. 3A–3B and 4A–4B.

Further provided in the device 1 is a magnification optics 22 located in the optical path of light emerging from the SLM unit (or from the polarizer 18 as in the present example) and propagating towards a projecting (or screen) surface 26. Thus, the beam 16 passes through the polarizer 18 that produces a polarized intensity modulated beam 20 indicative of an image to be projected by the magnifying optics 22 onto the screen surface 26. As known to those skilled in the art, a projected image 28 will stay in focus for a large variety of distances between the projecting device 1 and the screen surface 26 due to the nature of the light source and its coherence in the given optical path. Alternatively, when light is not coherent the focus can be manually adjusted by moving the magnifying lens 22 along the optical path.

Figure 2:
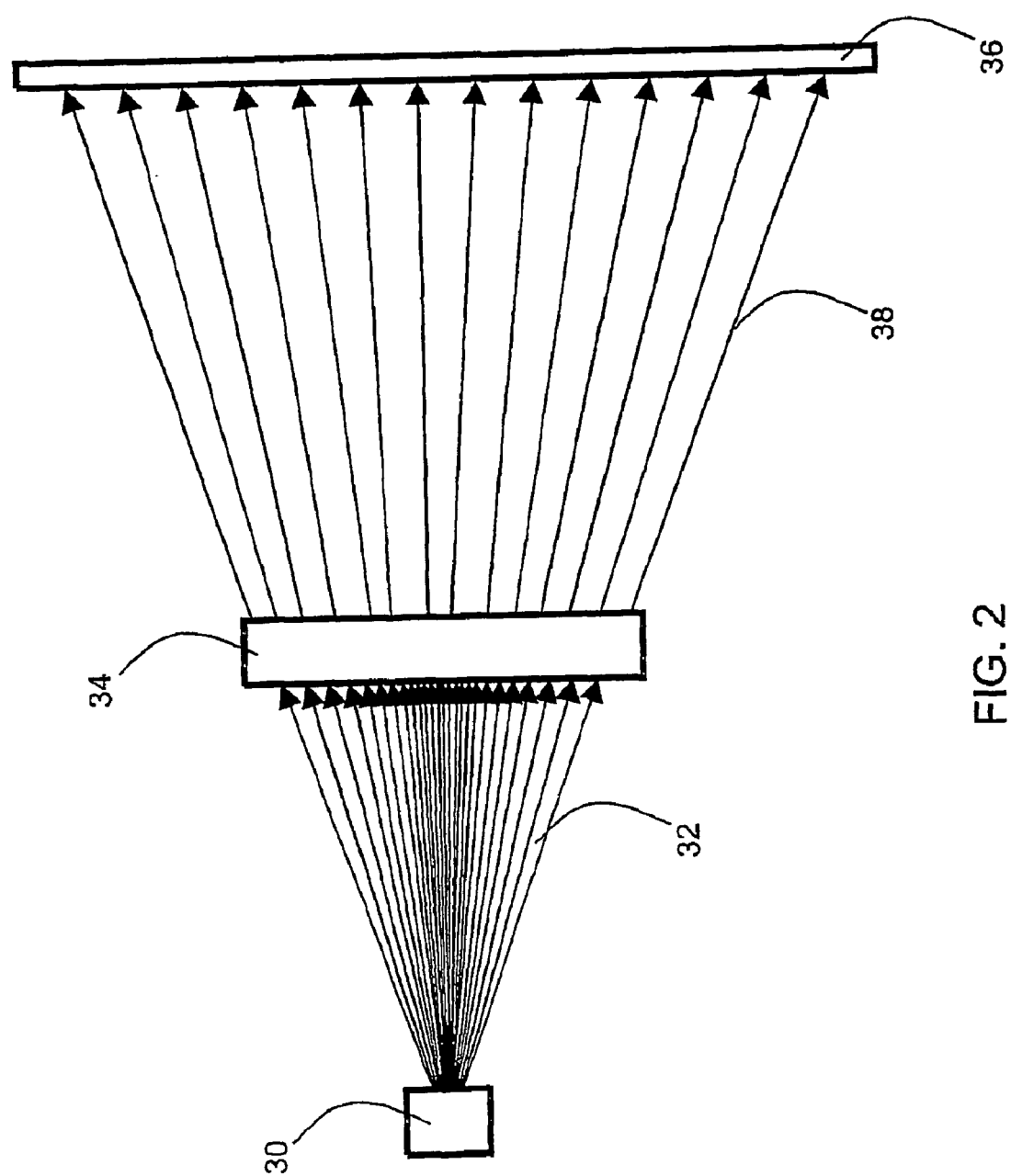
FIG. 2 more specifically illustrates the operation of a diffracting element (top-hat) used in the device of FIG. 1.

FIG. 2 more specifically illustrates the operation of the diffracting element 34 (top-hat) used in the device of FIG. 1. The top-hat element by itself does not form part of the present invention and its construction and operation are generally known, and consists of the following. A light source 30 that can be a laser diode or any other source creates a light beam 32 in which the light intensity near the axis of the beam is higher than that within the periphery of the beam (Gaussian intensity distribution). This beam is to be used for imaging (for example by the device 1 of FIG. 1) that requires substantially uniform light intensity distribution throughout the format of the image (i.e., within the cross section of the light beam). The diffractive optical element 34 is thus used to modify the beam intensity distribution to produce a beam 38 of the substantially uniform intensity distribution that can provide substantially uniform illumination of a screen 36.

It should, however, be noted that the light beam arriving at the projecting surface can still be somewhat non-uniform due to the limitations of the top-hat component 34 (about 96% of transmittance efficiency) and/or because of the non-uniform transmittance of the other components in the optical path. Compensation for such non-uniformity can be performed digitally by adjusting a control signal to every pixel of the pixel arrangement and providing an image-wise compensation bias, as will be explained further below with reference to FIGS. 6 and 7A–7B.

Figure 3A:
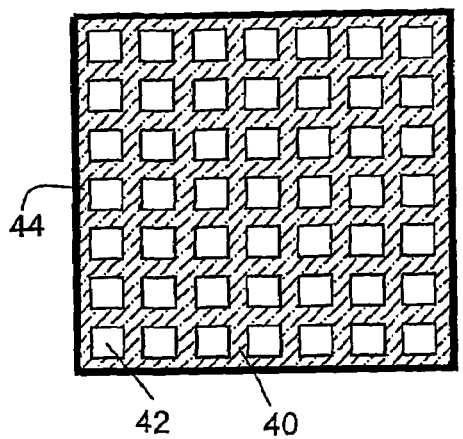
FIG. 3A illustrates the front view of the windowed structure of an SLM used in the device of FIG. 1.
Figure 3B:
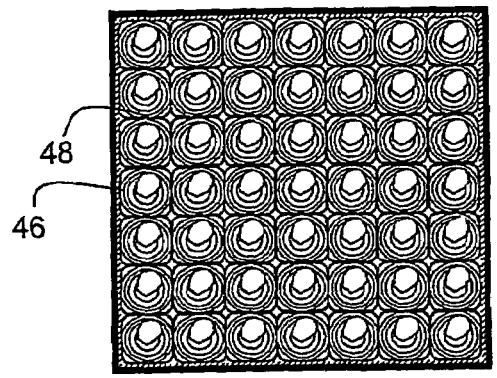
FIG. 3B illustrates the structure of a lenslet array used with the SLM of FIG. 3A.
Figure 4A:
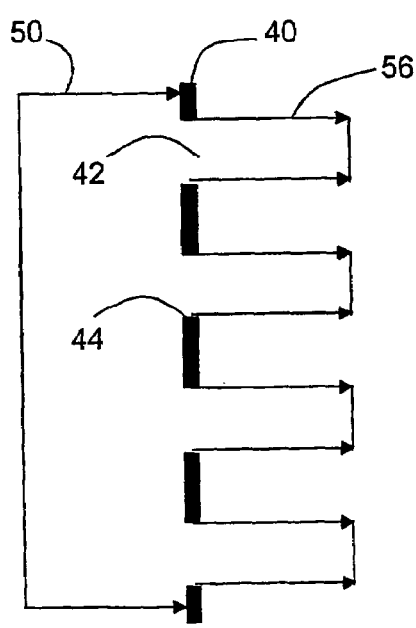
FIGS. 4A and 4B show beam propagation schemes through, respectively, the SLM of FIG. 3A and the SLM-with-lenslet array of FIG. 3B.
Figure 4B:
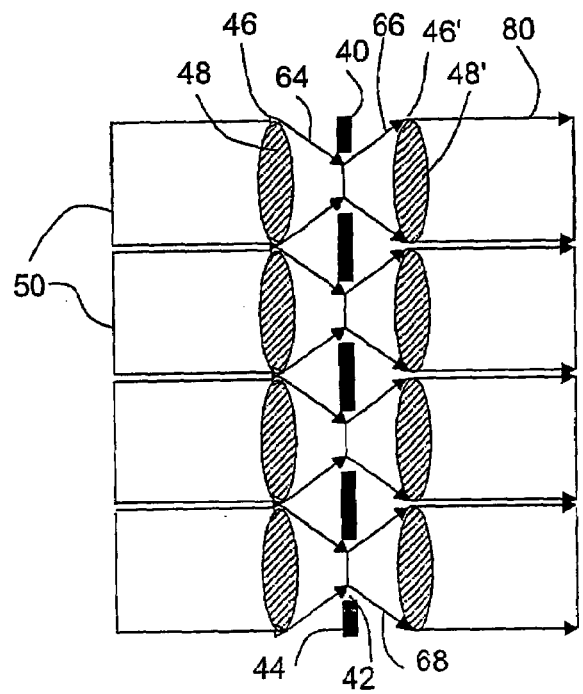

Reference is now made to FIGS. 3A–3B and 4A–4B. FIG. 3A illustrates the front view of the windowed structure of the SLM unit 12 used in the device of FIG. 1, and FIG. 3B illustrates the structure of the lenslet array 10 used with the SLM of FIG. 3A. FIGS. 4A and 4B show the beam propagation schemes through, respectively, the SLM of FIG. 3A and the SLM-with-lenslet arrays of FIG. 3B.

Thus, as shown in FIG. 3A, the pixel arrangement (windowed structure) 40 of a typical SLM is a two-dimensional array of spaced-apart cells 42. Approximately 40% (varies from one SLM to another) of the total surface of the structure 40 is composed of the active cells 42 while the rest of the surface is composed of a frame 44 that serves for mechanical support and control signals of the pixel array. FIG. 4A shows the side view of the pixel arrangement 40 and the propagation of a parallel light beam 50 therethrough. As can be seen, a portion of the incoming light 50 is blocked by the frame partitions 44, and only the remaining portion of the light 50 gets through the active cells 42. Thus the fill factor (i.e., effective transmission) for this typical SLM structure is approximately 40%.

FIG. 3B illustrates the structure of a lenslet array 46 to be used at opposite sides of the pixel arrangement 40 in the SLM unit according to the invention in order to increase the fill factor of the SLM. The lenslet array 46 is a two-dimensional array of miniature lenses 48 that matches the pixel arrangement 40 of active cells 42. Each lens 48 may have a square-like shape, and the adjacent lenses are tangent to each other thus fills most of the surface defined by the lens array 46 (i.e., fill factor of approximately 100%).

As illustrated in FIG. 4B, showing the pixel arrangement 40 with the first lenslet array 46 and the second lenslet array 46', the first lenslet array 46 is disposed at the input side of the pixel arrangement 40 very close thereto (up to a physical contact) and the second lenslet array 46' is disposed at the output side of the pixel arrangement 40 also very close thereto, up to a physical contact. Practically, the first and second lenslet arrays can be integrated with the pixel arrangement 40 being mounted onto the opposite surfaces thereof. Each lens 48 from the first array 46 and the respective opposite lens 48' from the second array 46' are associated with the corresponding one of the active cells 42. Each of the lenses 46 is optically designed to focus the corresponding component of the beam 50 onto a small area around its axis, at a distance of few microns behind the array. The pitch of the lenses 46 is matched to the pitch of the active cells 42, so that there is one active cell 42 centered right behind each lens, and the central point of the cell 42 is located in the back and front focal points of the respective lenslets 48 and 48', respectively. The first lenslet array 46 thus clusters the light beam 50 to correspond to the area of the arrangement 40 (active surface of the SLM unit) by splitting the light beam 50 impinging thereon into a plurality of components 64 and focusing each component by the respective lenslet to the respective pixel. The second lenslet array 46' is substantially identical to the first lenslet array and is positioned opposite to the array 46 at the other side of the pixel arrangement 40. The second lenslet array mirrors the optical effect of the first array, thus causing a reverse optical operation on the beamlets 66 emerging from the active cells 42. The second array 46' diverge the individual beamlets 66 spatially modulated by the arrangement 40 to create a light beam 80. The optical characteristics of the lenslets in the arrays as well as the distance between the first and second arrays 46 and 46' and the pixel arrangement 40 can be determined by simple optical alignment methods known in the art so as to provide that the diameter of the beamlet 64 when reaching the active cell 42 is smaller than the aperture of the cell 42, thus all the light of the beamlet 64 passing through the active cell 42.

Thus, the total effect of the combination of the pixel arrangement 40 with the first and second lenslet arrays 46 and 46' is as follows: the incoming light beam 50 is divided by the passage through the lenslet array into separate focused beamlets 64, that then pass through the cells 42 of the pixel arrangement 40, where they are modulated according to the control signal (indicative of the data to be imaged) to produce a plurality of focused beamlets 66 emerging from the pixel arrangement.

The beamlets 66 pass through the lenslets 48' that create therefrom the parallel beam 80 of spatially modulated light. As a result, the fill factor of the combined arrangement (lenslet arrays and pixel arrangement) is substantially higher than that of the pixel arrangement 40 by itself, and the total efficiency of the modulation process is thus substantially improved. The provision of the lenslet arrays improves the transmission efficiency of the SLM by up to 30% and more. It should be understood that when using the SLM with all active pixels, the efficiency of the SLM unit can be improved by a factor of 2 due to the use of the lenslet arrays at both sides thereof.

Figure 4C:
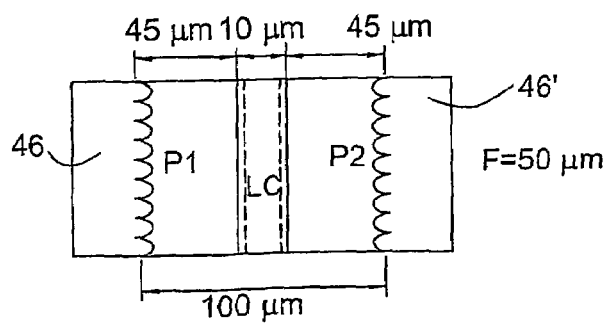
FIG. 4C illustrates a specific example of the SLM unit construction.

As exemplified in FIG. 4C, the SLM unit may be of a 100 μm thickness, wherein the pixel arrangement (e.g., LC unit) has a thickness of 10 μm and each of the polymer spacings $P_1$ and $P_2$ has a thickness of 45 μm. The SLM unit may be manufactured using stamping and hat embossing techniques.

Figure 5A:
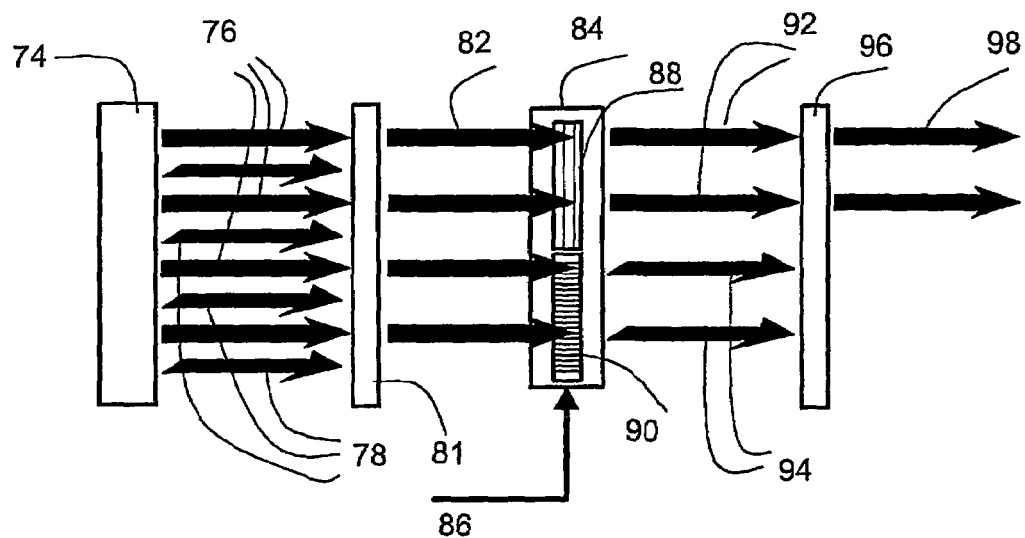
FIGS. 5A and 5B demonstrate the principles of intensity losses caused by using unpolarized and polarized light sources, respectively.
Figure 5B:
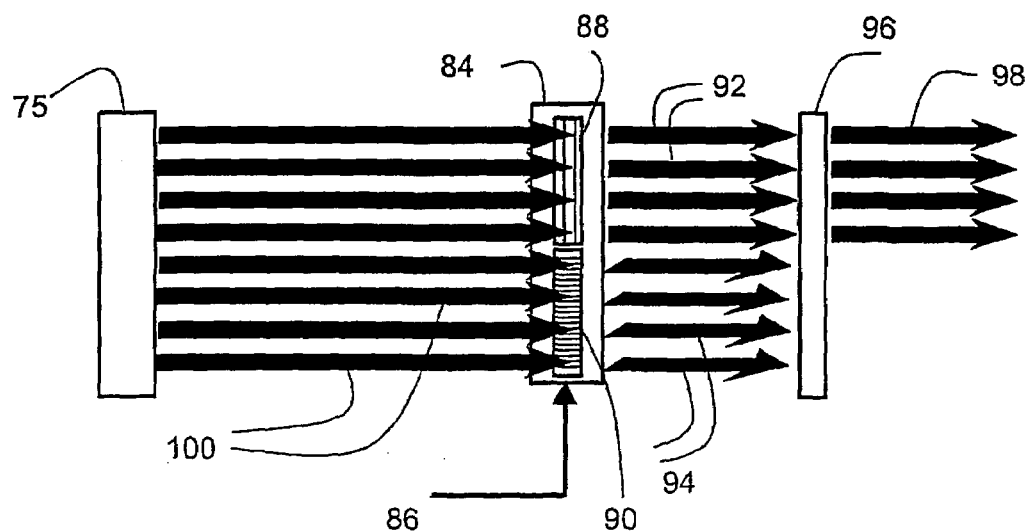

As indicated above, the device of the present invention preferably utilizes a polarized light source. FIGS. 5A and 5B demonstrate the principles of intensity losses caused by using unpolarized and polarized light sources, respectively. FIG. 5A shows the basic optical path suitable to be used in a projector (or display) and utilizing a typical non-polarized light source 74. Such an optical path thus comprises the light source 74, a first polarizer 81, an SLM 84 and a second polarizer 96. The non-polarized light source 74 creates a light beam that can be represented by two components 76 and 78 of the opposite linear polarizations. Both components 76 and 78 impinge onto the first polarizer 81, and only one of them can pass therethrough while the other is rejected away, depending on the orientation of the plane of polarization of the device 81. Thus, the energy of a polarized light beam 82 emerged from the polarizer 81 is half of the input energy of the non-polarized light beam. The SLM 84 receives the polarized light beam 82 and modulates it by an input signal 86 to affect the polarization of corresponding light components of the beam 82 according to the input signal 86. For the simplicity of demonstration, the SLM 84 is represented as an element consisting of two polarization areas 88 and 90, i.e., two cells or pixels one of which 90 being currently operated by the control signal 86 and the other 88 being not. Hence, a light portion 92 that emerges from the area 88 has its original polarization, and a light portion 94 that emerges from the area 90 has its polarization affected in accordance to the input signal 86, e.g., has the orthogonal polarization with respect to its original polarization state. Both light portions 92 and 94 impinge onto the second polarizer 96 that transmits only light identical in polarization to that transmitted by the first polarizer 81. Thus, only the light portion 92, the polarization of which was not effected by the SLM 84, can pass through the polarizer 96, and the intensity of the output beam 98 is half of that emerging from the first polarizer, and practically a quarter of the light generated by the light source.

FIG. 5B shows the basic optical path for use in a projector (or display) and utilizing a high-ratio polarized light source as proposed by the present invention. To facilitate understanding, the same reference numbers are used for identifying components that are common in the examples of FIGS. 5A and 5B. Thus, the optical path of FIG. 5B comprises a high-ratio polarized light source 75, an SLM 84, and a polarizer 96 (the need for the first polarizer 81 of FIG. 5A be therefore eliminated here). Light 100 generated by the light source 75 is linearly polarized. A light portion 92 that emerges from the SLM area 88 not operated by a control signal has its original polarization, and the polarization of a light portion 94 that emerges from the SLM area 90 operated by the control signal 86 is changed, e.g., to the orthogonal polarization. Both light portions 92 and 94 impinge onto the polarizer 96 that transmits only light with the polarization state identical to that produced by the light source. Thus, only the light portion 92, the polarization of which was not effected by the SLM 84, can pass through the polarizer 96. Similar to the previous example of FIG. 5A, the intensity of the output beam 98 is half of that provided by both light portions 92 and 94. However, this intensity of both light portions 92 and 94, i.e., the intensity of light impinging onto the SLM 84 is that generated by the light source, namely, is twice as much of the intensity of the SLM input light 82 in the example of FIG. 5A, due to the use of the polarized light source. Thus the optical efficiency of the optical path of FIG. 5B is higher by a factor of 2 than that of FIG. 5A.

Figure 6:
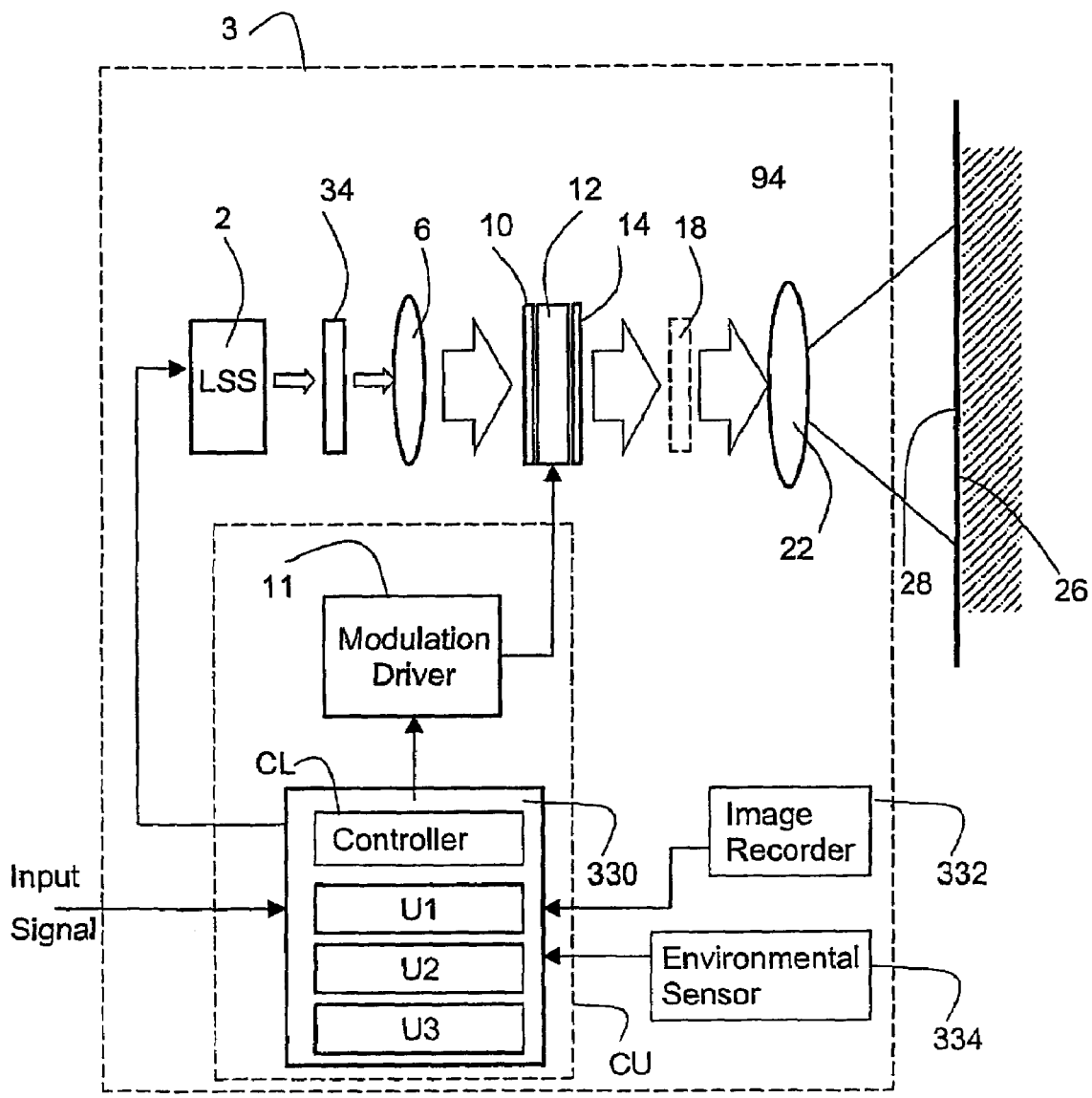
FIG. 6 more specifically illustrates an image processor unit according to the invention used with the device of FIG. 1 to improve the quality of the projected image.

Turning now to FIG. 6, illustrating an image projecting device 3 according to another embodiment of the invention. The same reference numbers are used for identifying the common components in devices 1 (FIG. 1) and 3. The device 3 additionally comprises a control unit CU (typically a computer device), wherein, in this specific example, the modulation driver 11 is a part of the control unit. The control unit CU thus comprises the driver 11 and a processor utility 330, and is associated with an image recorder 332 and an environment sensor 334. The driver 11, that generates control signals (modulation signals) to the SLM pixel arrangement, is operable by a signal indicative of the image to be projected ("image signal"). The image signal is generated by an appropriate signaling utility (not shown here) that may and may not be a part of the control unit of the projector device, and may typically be a part of an external computer device (such as PC, phone device, PDA, etc.) where the data to be images is produced. In this specific example of FIG. 6, the image signal is supplied to the driver 11 through the processor utility 330, but it should be understood that the image signal can be supplied directly to the driver 11. The image recorder 332 is an imaging device such as a video camera, which is oriented and operable to generate data indicative of the projected image 28. The environment sensor may include one or more sensing units detecting the environment condition of the kind defining the required intensity and/or color mixture of the projecting light, e.g., the light intensity sensor (such as a CCD RGB/Temperature single pixel sensor) capable of detecting the intensity of ambient light in the vicinity of the screen surface 26 and generating corresponding data.

The processor 330 includes inter alia a controller CL, and three utility parts (suitable software and/or hardware) $U_1$, $U_2$ and $U_3$ for processing, respectively, the image signal coming from the controller, the data coming from the image recorder, and the data coming from the sensor device. The utility $U_1$ is preprogrammed to analyze the image signal in accordance with the SLM pixel arrangement so as to perform digital image jittering and attenuation (changing of gray levels) on the pixel arrangement (via the driver 11) in order to reduce effects of speckles in the projected image, as will be described more specifically further below with reference to FIGS. 8A and 8B. The utility $U_2$ is preprogrammed to analyze the data indicative of the projected image 28 and apply a digital processing of the image signal to thereby compensate for the non-uniformity of the light intensity (brightness) within the projected image. This is described below with reference to FIGS. 7A–7B. The utility $U_3$ is preprogrammed to analyze the data indicative of the environment condition and modulate the laser source 2 accordingly to adjust either one of the intensity and color mixture, or both. Thus, the provision of the control unit and associated sensor devices (e.g., camera, RGB/Temperature sensor), as well as the digital processing of the image signal, improves the quality of the projected image and the energy efficiency of the projecting device.

Figure 7A:
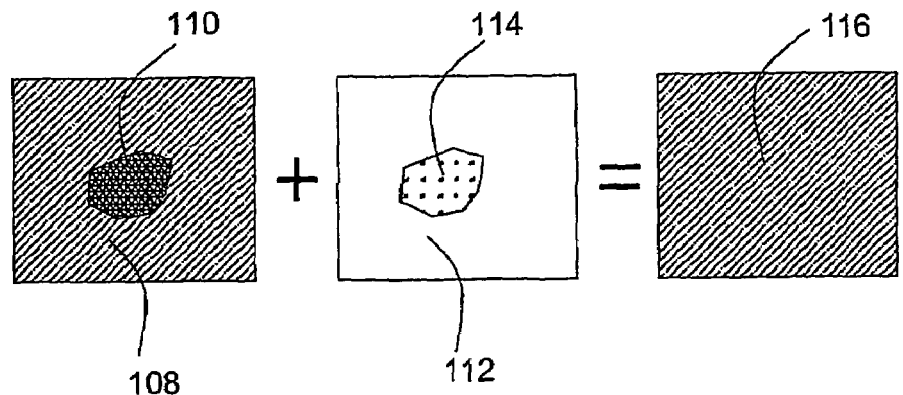
FIGS. 7A and 7B more specifically illustrate the operation of the device of FIG. 6 to improve the brightness within the projected image.
Figure 7B:
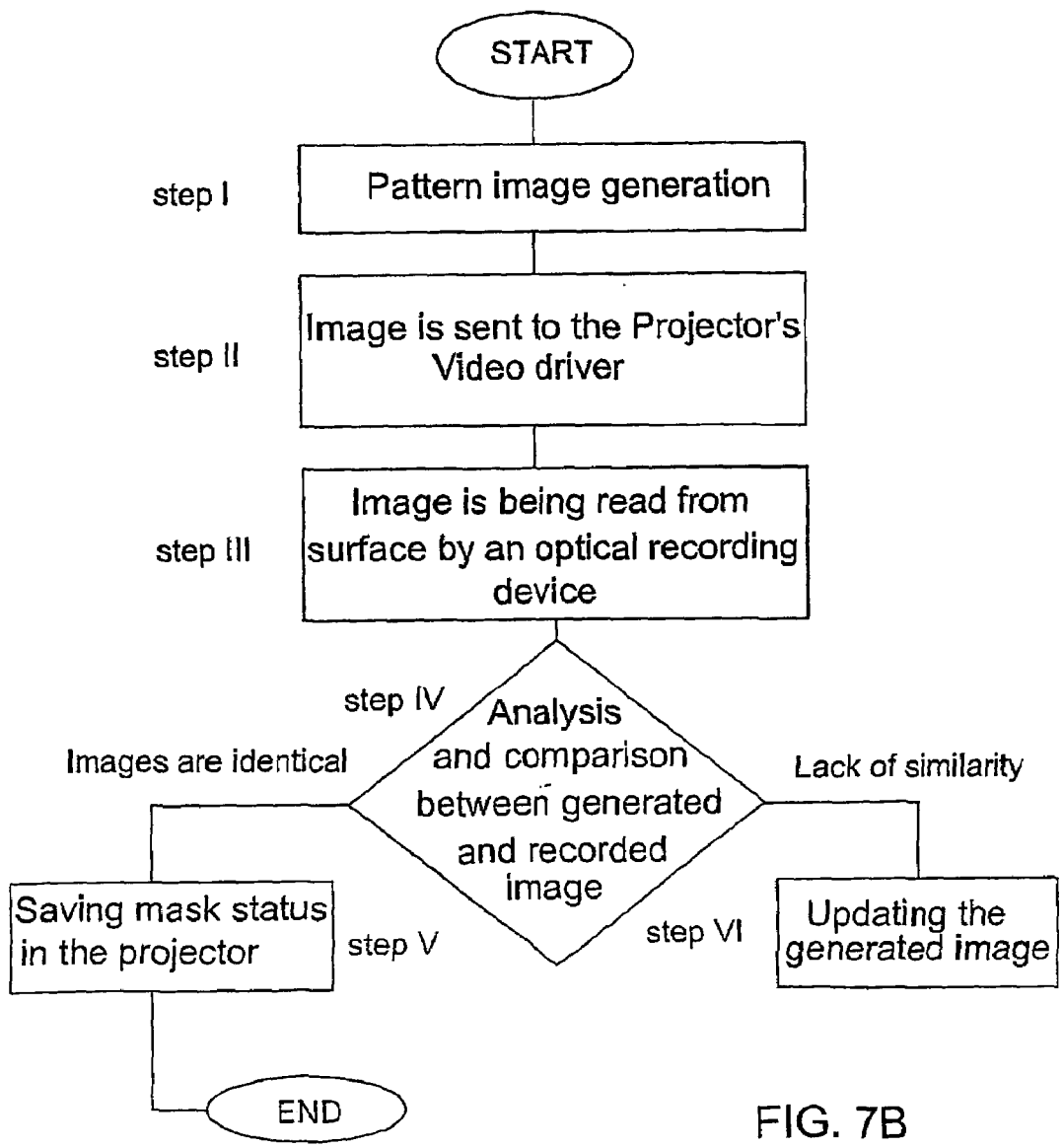

FIGS. 7A–7B exemplifies the operation of the projecting device equipped with the processor 330 to provide digital compensation of a light modulated image on the target (screen surface). FIG. 7A shows the light modulated image 108 containing non-uniform areas, with over intensive spots of light 110. A digital mask 112 designed to decrease the light intensity within the area 114 is applied to the light modulated image 108 resulting in a final output image of uniform brightness intensity on a target 116. FIG. 7B illustrates a basic calibration procedure of the digital mask. The processor 330 (controller CL) receives a pattern-image signal (generated either externally by a video generating device (PC, VCR, etc.) or internally in the controller CL), and generates a control signal indicative of the pattern image (Step I). This pattern-image signal is transmitted from the processor to the driver 11 (Step II) to operate the SLM pixel arrangement accordingly to enable projection of images with the original non-uniformity in brightness. The light dispersal of the projected images is projected on the screen surface (26 in FIGS. 1 and 6). A digital camera (332 in FIG. 6), or any other kind of optical recording device, scans the projected image (Step III). Digital output data of the camera 332 indicative of the recorded image is received by the utility ($U_2$ in FIG. 6), that analyzes this data and operates together with the controller CL to compare the data indicative of the recorded image with the generated image (created in accordance with the original input signal), and if the images are identical, the calibration result in the form of a final digital mask is generated. If the lack of similarity in the signals is determined, an updated image is generated accordingly to obtain the final digital mask (steps IV and V). The controller CL then saves the calibration result (digital mask status) in the driver 11 in order to update the projecting device with the correct parameters of brightness levels (step VI). It should be understood that the utility $U_2$ may not be a part of the processor, but be a stand-alone image processing unit connectable to the image recording device 332 and to the processor 330.

Figure 8A:
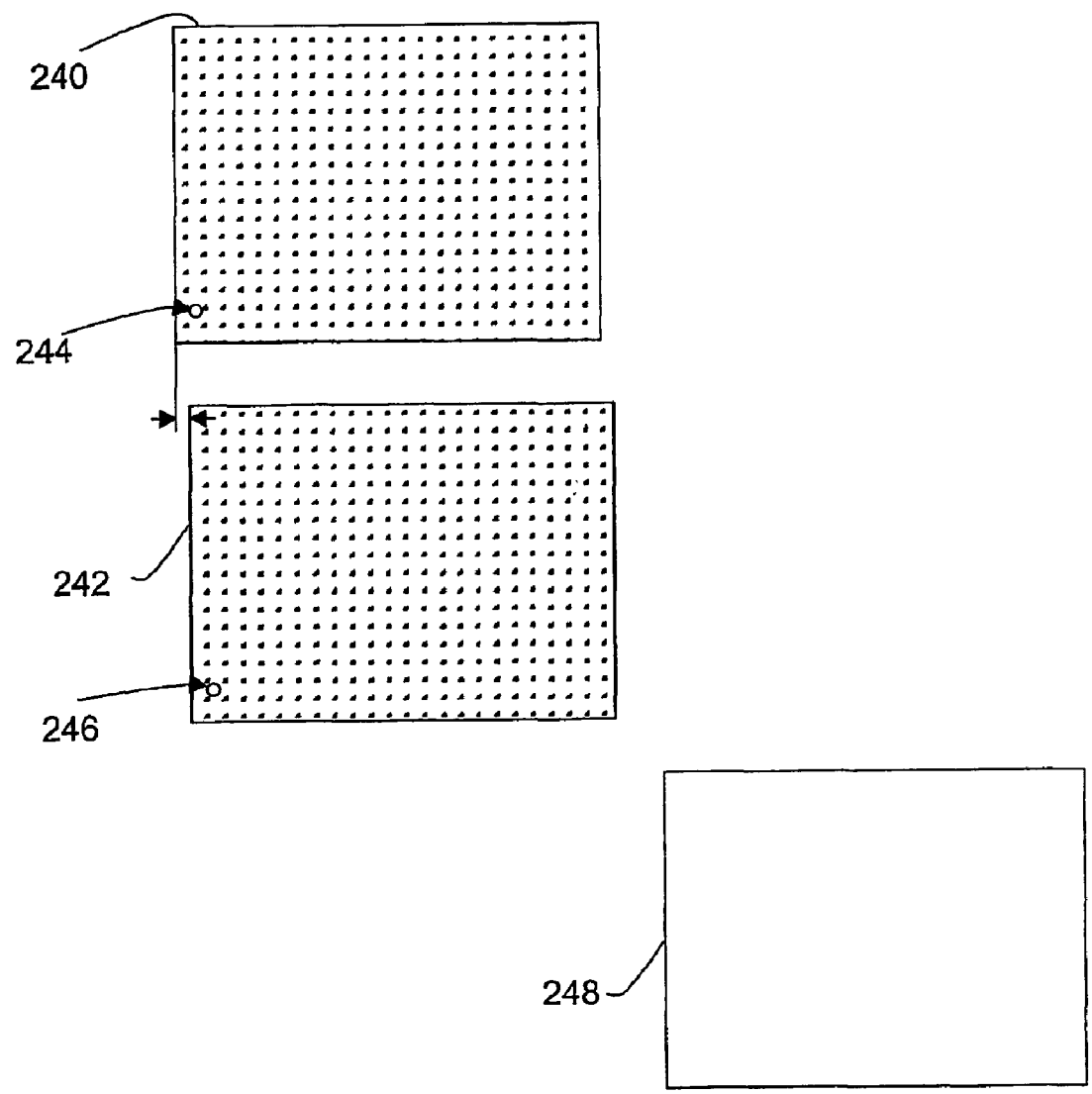
FIGS. 8A and 8B more specifically illustrate the operation of the device of FIG. 6 aimed at solving the speckles-associated problem.
Figure 8B:
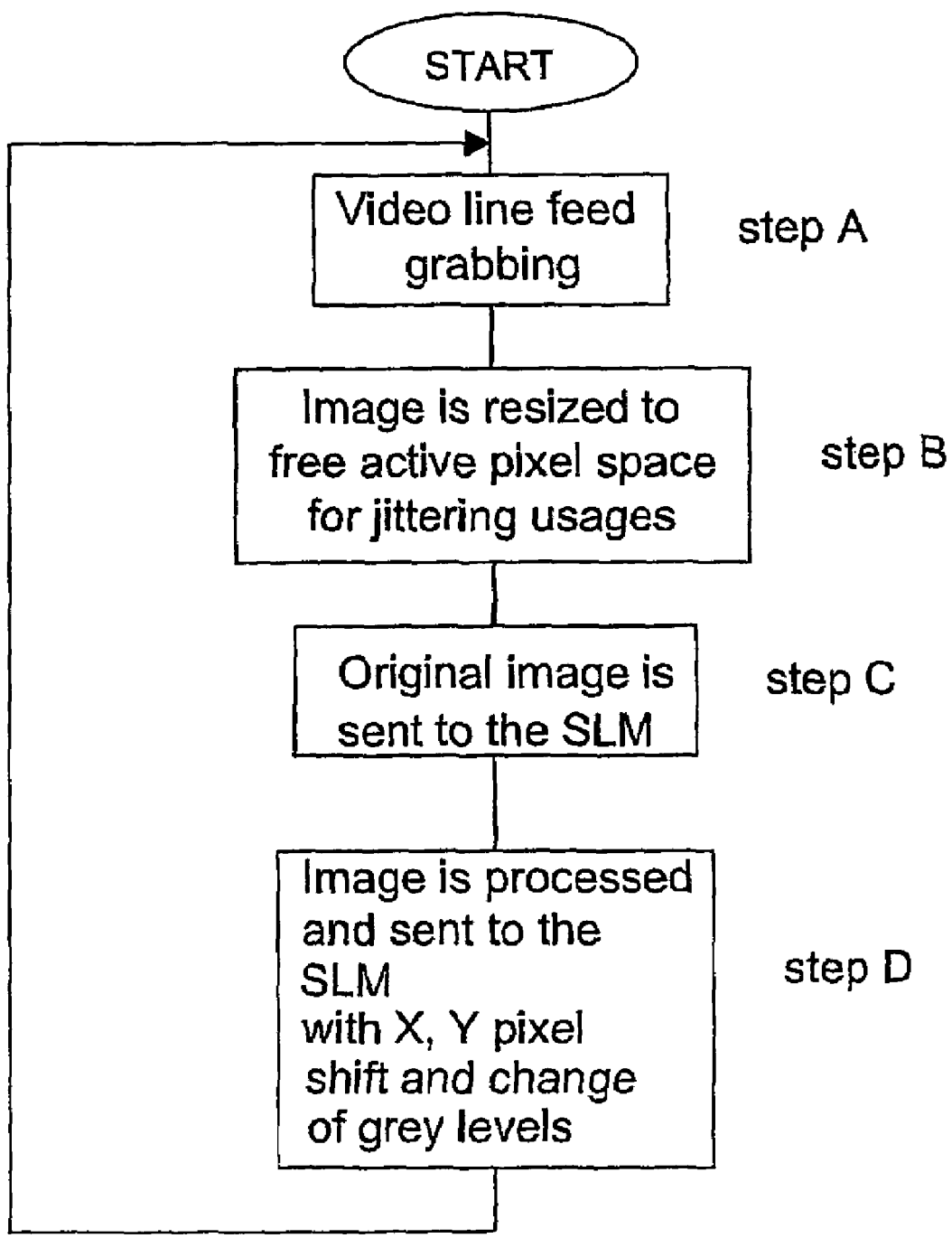

FIGS. 8A and 8B more specifically illustrate the operation of the device according to the invention aimed at eliminating the speckle effect which appears in the projected screen. As shown in FIG. 8A, an original projected image 240 appears as an image with granular nature, the so-called "speckle effect". This effect is observed with highly coherent illumination, when the screen surface is not totally smooth. In order to eliminate this problem, the original image 240 is jittered and the gray level is also attenuated by a maximum displacement of one pixel as it appears in a shifted projected image 242. Every pixel is now jittered and attenuated with such velocity that the human eye is unable to notice this effect. For example, an original pixel 244 is jittered to a new position 246, so that this motion causes the coherence of the illumination to be at least partially destroyed, and the speckles "wash out" during the projecting process, thereby producing a clear (speckles-free) image 248. The main operational steps of this procedure are shown in FIG. 8B. The original image (i.e., the image to be projected) is grabbed from the driver 11 of the SLM, or from the controller CL as the case may be, (step A), and is processed by the utility $U_1$ to resize this image to free active pixel space used for jittering purposes (step B), thus leaving more extra space in the corners and panels of the SLM pixel arrangement. Data indicative of the so-produced resized image is transmitted to the driver 11 (step C), where the image is shifted accordingly in a plane along two perpendicular axis by shifting one or more image pixel to be in the pixel areas that were defined as area not in use, and modulated to provide changes in gray level (step D). By this, a circular movement of the image on the SLM surface is provided in a high frequency circulation, ensuring that the circulation process remains unnoticeable to the observer and at the same time ensuring that the image on the SLM surface moves along the two axes repeatedly, resulting in the reduction of the speckle phenomenon viewed to the observer. It should be noted that such parameters as the frequency of circulation, number of shifted pixels, and the step of movement along either one of the two axes or both is controlled by the given algorithm for different outcome results in different given situations.

Figure 9:
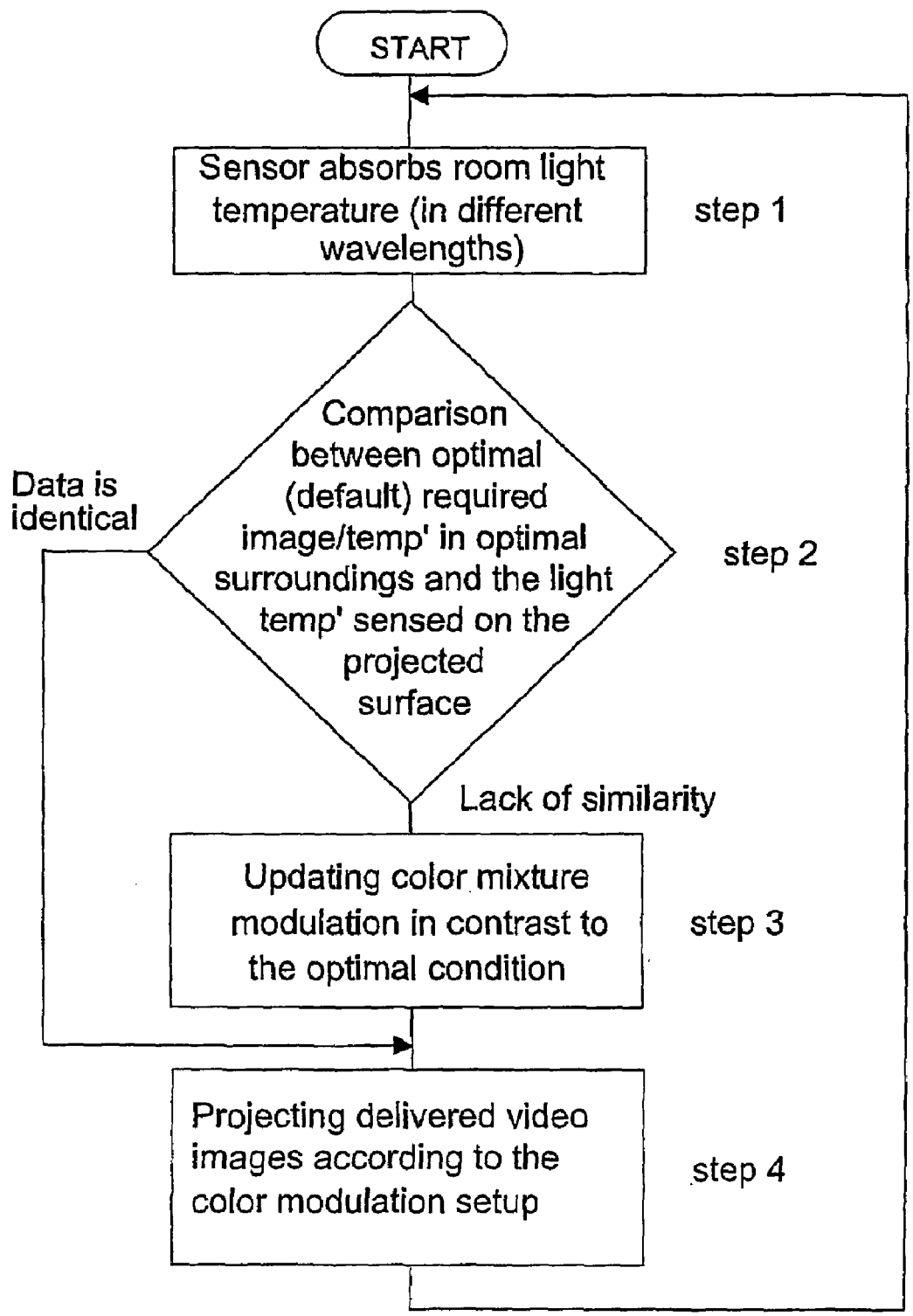
FIG. 9 is a flow diagram of the main operational steps in a method according to the invention aimed at color-mixture modulation of light inputting the SLM.

FIG. 9 is a flow diagram of the main operational steps of the processor 330 to meet the requirements of the environment by utilizing color-mixture modulation of light inputting on the SLM pixel arrangement. In the present example, the environment sensor is a temperature sensor (i.e., sensing the intensity of the ambient light). The processor utilizes the sensing data to enable optimization of the light source total consumption by changing switching modulation of color mixture according to the surrounding light condition, thus receiving the most intensive image exposed to the human eye in the contrast of the surrounding interfering light. This is implemented in the following manner:

The sensor absorbs room light temperature (in different wavelengths) in the vicinity of the screen surface (step 1). Data indicative of the absorbed light is received by the processor (utility $U_3$ in FIG. 6) that compares between the optimal (default) required image/temperature in optimal surroundings and the light temperature sensed on the projected surface (step 2). If a lack of similarity is determined, the processor updates color mixture modulation of the light source (step 3) in contrast to the optimal condition, and then allows for projecting the images according to the new color modulation (step 4).

Figure 10A:
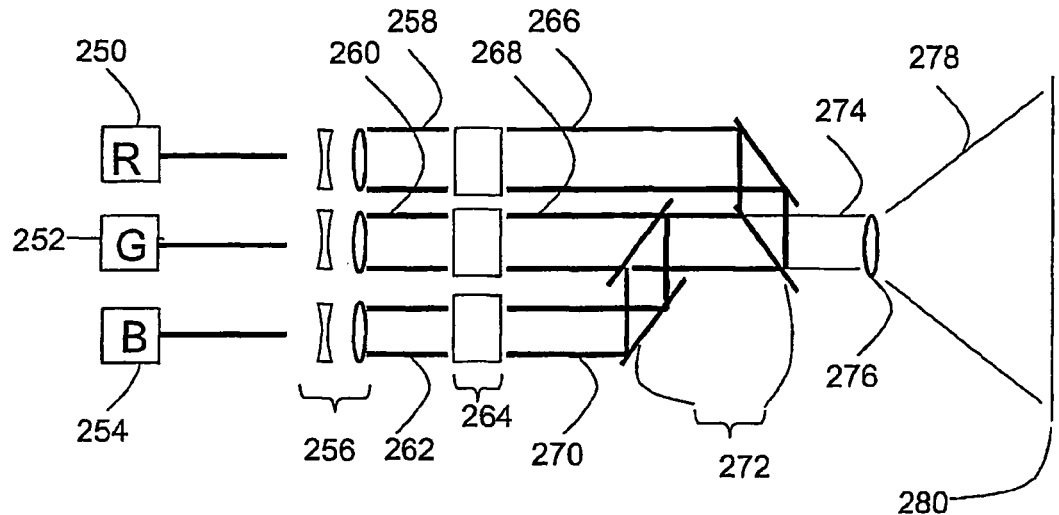
FIGS. 10A to 10E schematically illustrate different examples of the implementation of projection of color images suitable to be used in the device of the present invention.
Figure 10B:
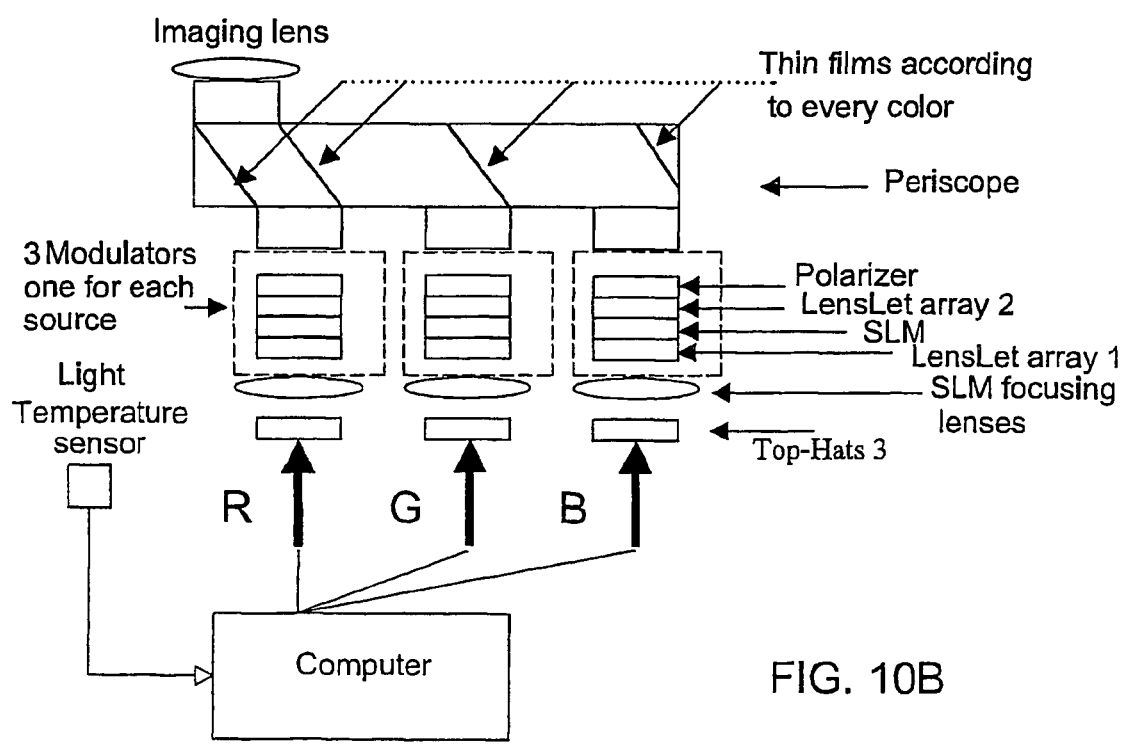
Figure 10C:
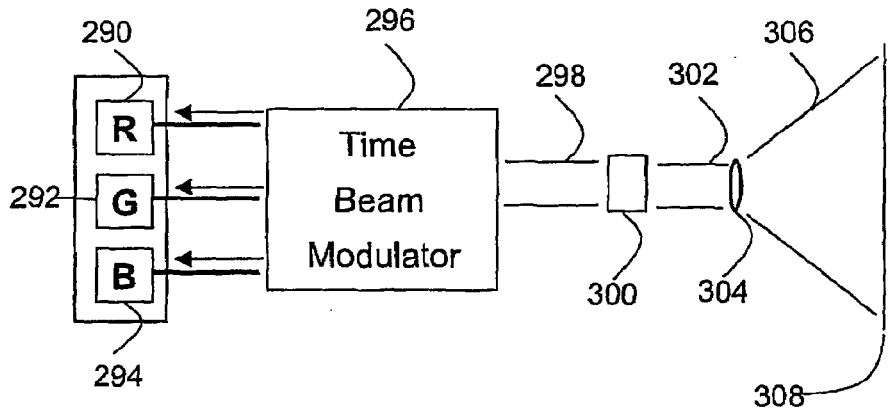
Figure 10D:
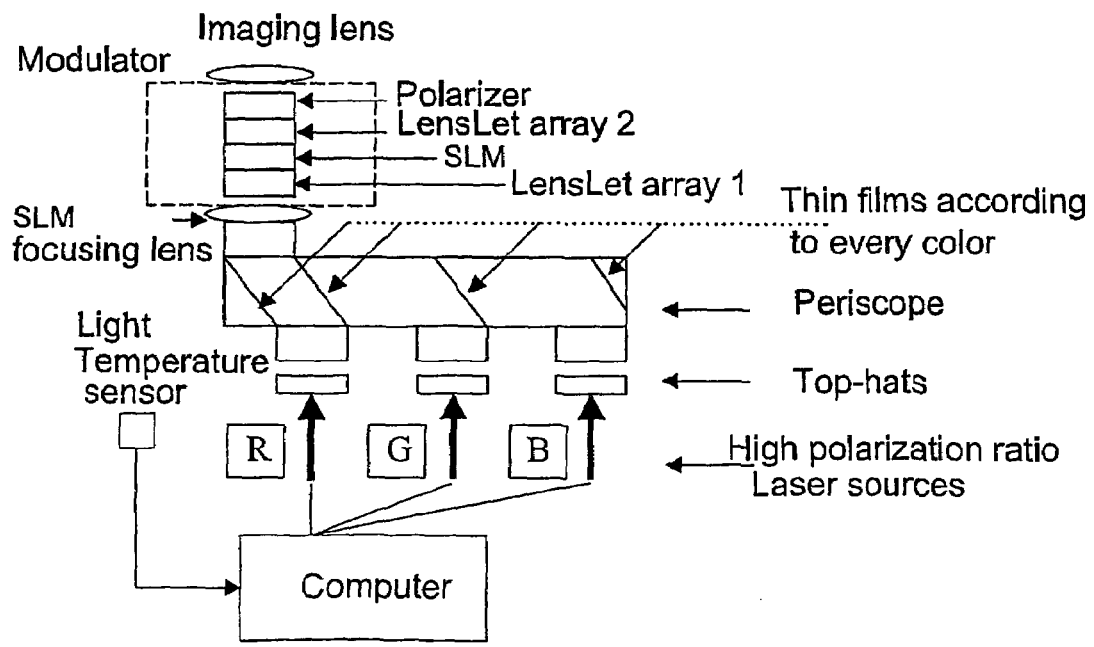
Figure 10E:
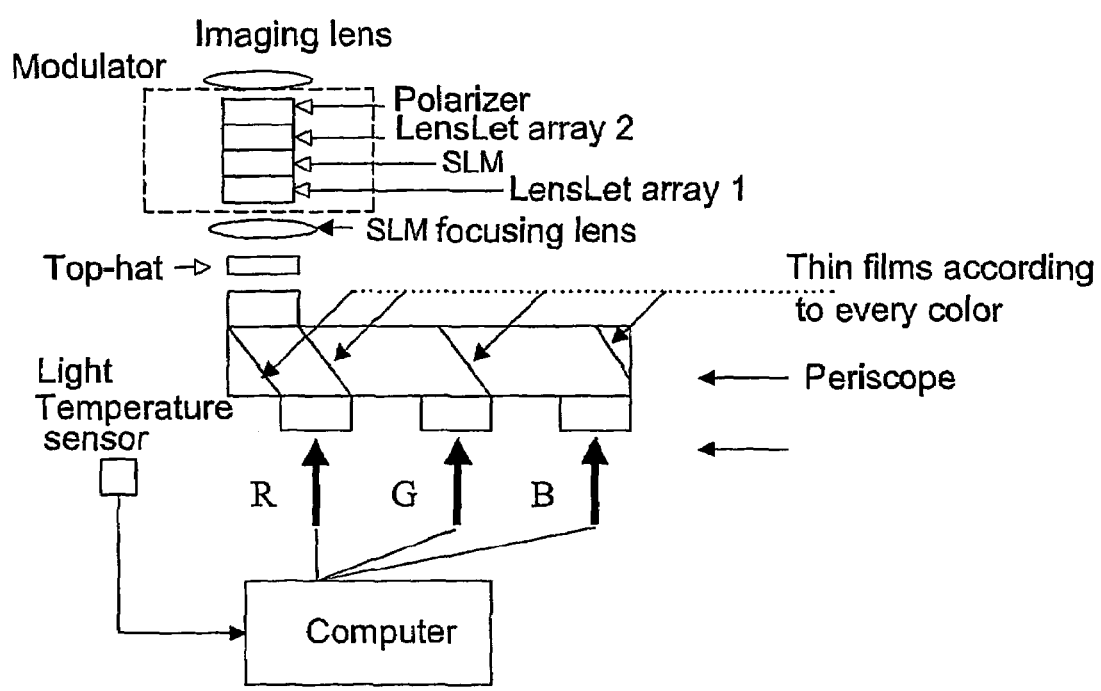

Reference is now made to FIGS. 10A–10E schematically illustrating different implementation examples of projection of color images suitable to be used in the device of the present invention. FIG. 10A shows a schematic block diagram of the device according to one example of this concept and FIG. 10B shows one possible implementation thereof. FIG. 10C shows a schematic block diagram of the device according to another example, and FIGS. 10D and 10E show two possible implementations of this example. In the example of FIGS. 10A–10B, the primary colors R, G and B are modulated via three optical paths, respectively, each having its associated SLM, while in the example of FIGS. 10C–10E, the primary colors, R, G and B are modulated via the same optical path and consequently the same SLM by utilizing the time beam modulator.

As shown in FIG. 10A in a self-explanatory manner, R, G, and B light components 250, 252 and 254 are generated by three laser sources, respectively, e.g., compact laser diodes with appropriate powers in order to get a white source. Each light component is widened by its associated beam expander, generally at 256, and the widened RGB beams 258, 260 and 262 are then projected through the SLMs 264, each containing a spatially modulated signal according to the input picture. Then, the spatially modulated RGB beams 266, 268 and 270 are combined by a set of beam combiners (beam splitters) 272 into a white beam 274 that passes through an imaging lens 276, and the so-produced output beam 278 is projected onto a screen surface 280, where the output image appears. This arrangement is generally known and by itself does not form part of the present invention, but can be utilized in the projecting device of the present invention as shown in FIGS. 1 and 6, and as further shown in a self-explanatory manner in FIG. 10B.

As shown in FIG. 10C, the RGB laser beams 290, 292 and 294 are time modulated by a beam modulator 296 (prior to or after passage through a beam expander). Then, the time-modulated beam 298 is projected through a single SLM 300. The spatially (and time) modulated beam 302 then passes through an imaging lens 304, and the so-produced output beam 306 is projected onto a screen surface 308, where the output image appears. Similarly, this scheme is generally known and can be used in the device of the present invention. As shown in FIGS. 10D and 10E in self-explanatory manner, a diffractive element can be utilized by three top-hat elements in front of the RGB laser beams 290, 292 and 294, respectively, or utilizing a common top-hat element.

The projecting device of the present invention can be used in various applications being connectable to and/or forming part of a computer device, such as PC, phone device, PDA, etc. FIGS. 11A to 11H schematically illustrate different applications of the projecting device according to the invention.

Figure 11A:
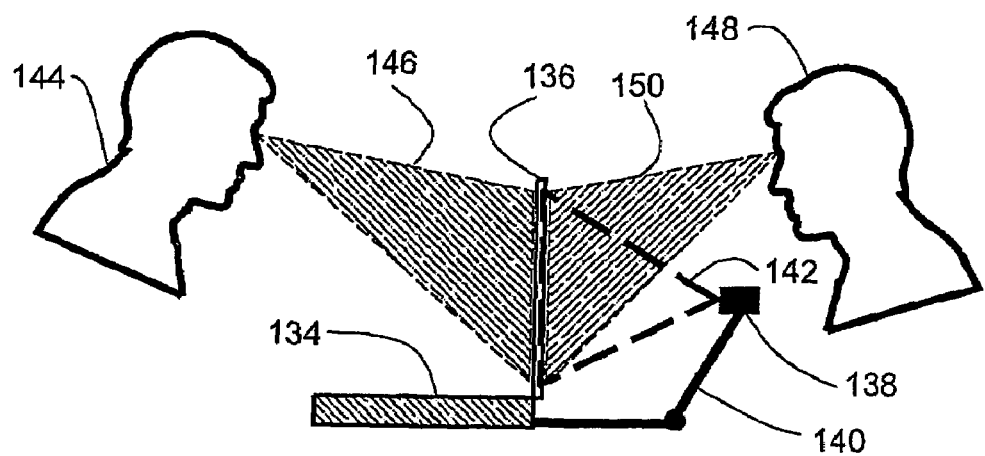
FIGS. 11A to 11H schematically illustrate different applications of the projecting device according to the invention.

In the example of FIG. 11A, the micro-projector device 138 of the present invention is used with a bi-directional semi-transparent screen 136 of a laptop 134, and enables content viewing of images on both sides of the screen. In the present example, the device 138 is supported by a holder 140, and is connected to a corresponding utility of the laptop to receive an imaging signal to create a projected image 142 onto the screen 136 to be viewed by two observers 144 and 148 at opposite sides of the screen at two angles of observation 146 and 150, respectively.

Figure 11B:
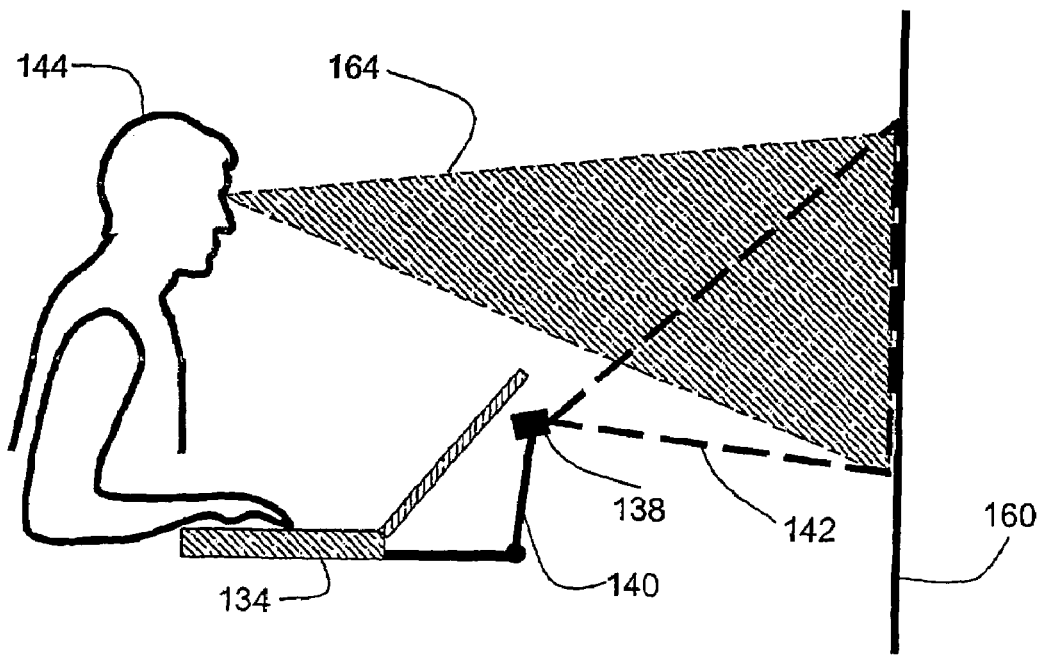

FIG. 11B shows how the device of the present invention can be used with the conventional laptop computer while eliminating the need for an LCD screen typically used in these computers. To facilitate understanding, the same reference numbers are used to identify common components in the examples of FIGS. 11A and 11B. As shown, the image is projected with an angle of projection 142 onto an external screen surface 160 opposite to the user's eyes, i.e, to be viewed by the user with the angle of observation 164. It should be understood, although not specifically shown, that the projector device 138 can be oriented to project the image onto the table's surface adjacent to the computer, or onto the inner/outer surface of the laptop cover. Thus, user 144 while working on a portable laptop computer may advantageously operate with a larger screen, or while operating on a computer with no display at all, can utilize the projector device of the present invention for imaging data on an external surface. It should be understood that such projection of images on an external screen surface can be used with any communication device, e.g., a phone device.

Figure 11C:
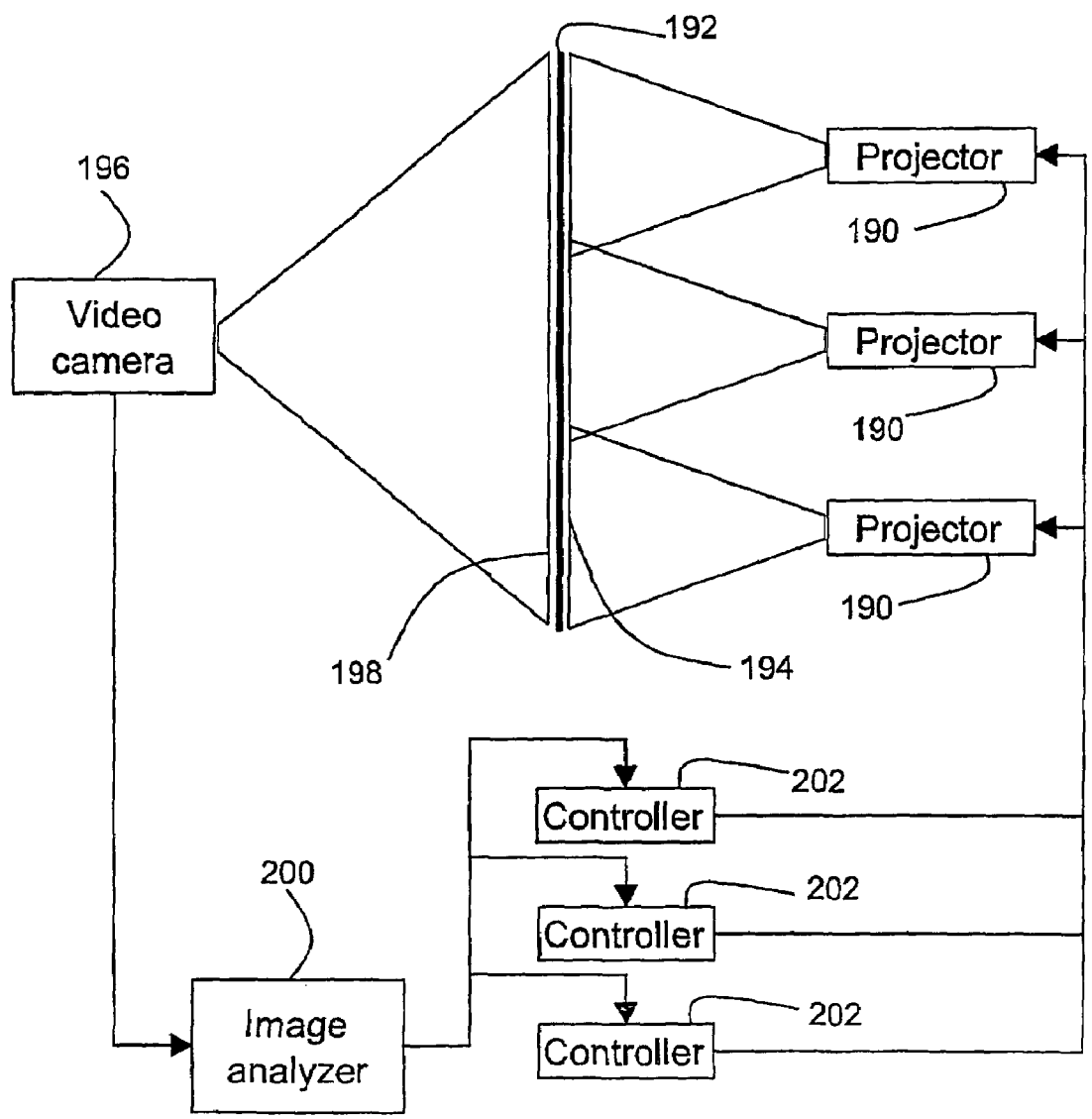
Figure 11D:
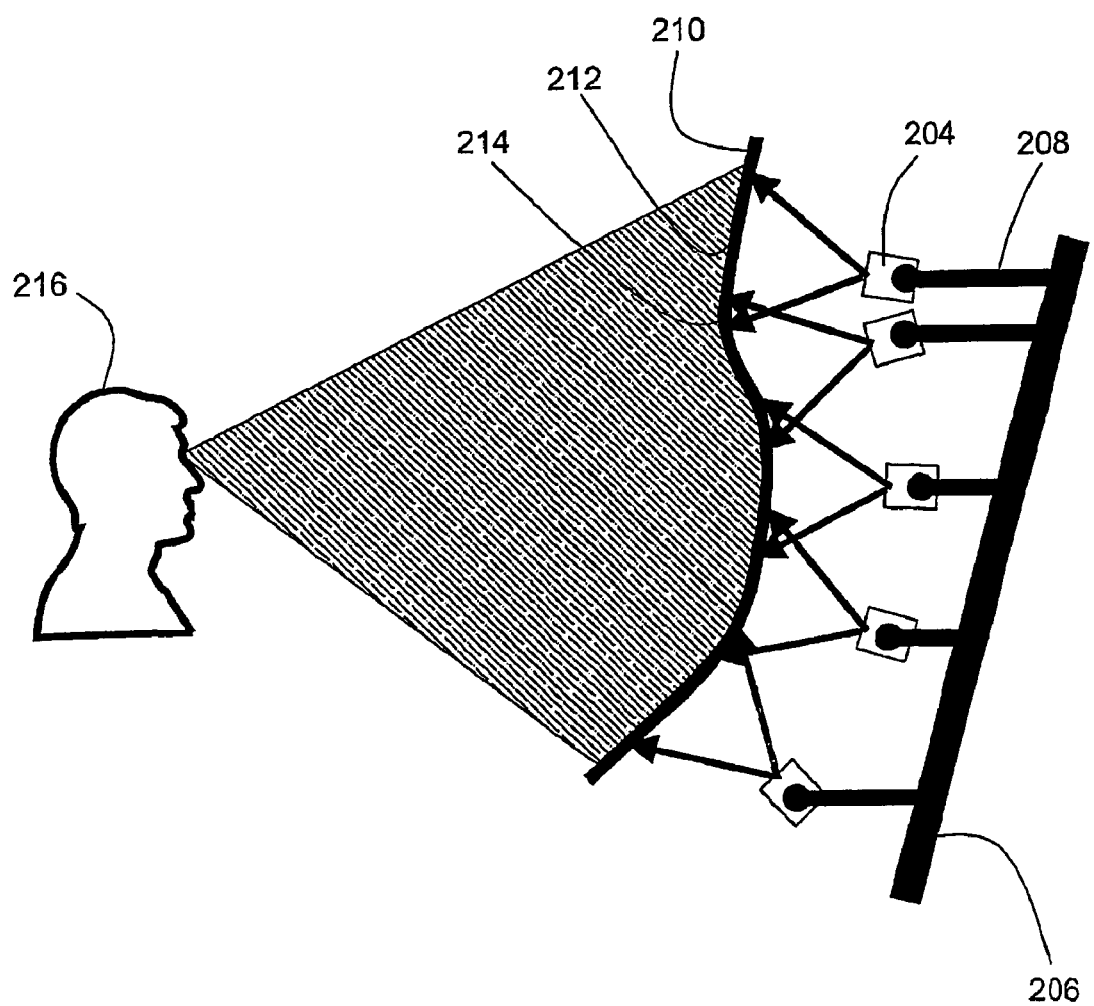

FIG. 11C exemplifies the use of several micro-projectors of the present invention, generally at 190, operable together to obtain a large projected screen 192 (video wall) by combining several small screens 194, each produced by the corresponding one of the micro-projectors. A large image 198 is captured by a video camera 196 and transferred to the processor (image analyzer) 200 which operates to compare data indicative of the large image 198 and data indicative of small images 194, and produces an output signal to the controllers 202, causing them to reproduce the signal in such way that will cause the projectors 190 to present the images 194 in alignment as a whole and seamless. The same configuration can be used to project images onto a concave seamless display of any desired shape. This is schematically illustrated in FIG. 11D. The main holder 206 holds several projector devices 204, each on a separated branch holder 208. Each projector 204 projects a small image 212 onto a concaved surface 210 to be viewed by an observer 216 as a large concaved seamless image formed by small images partially overlapping each other 214.

Figure 11E:
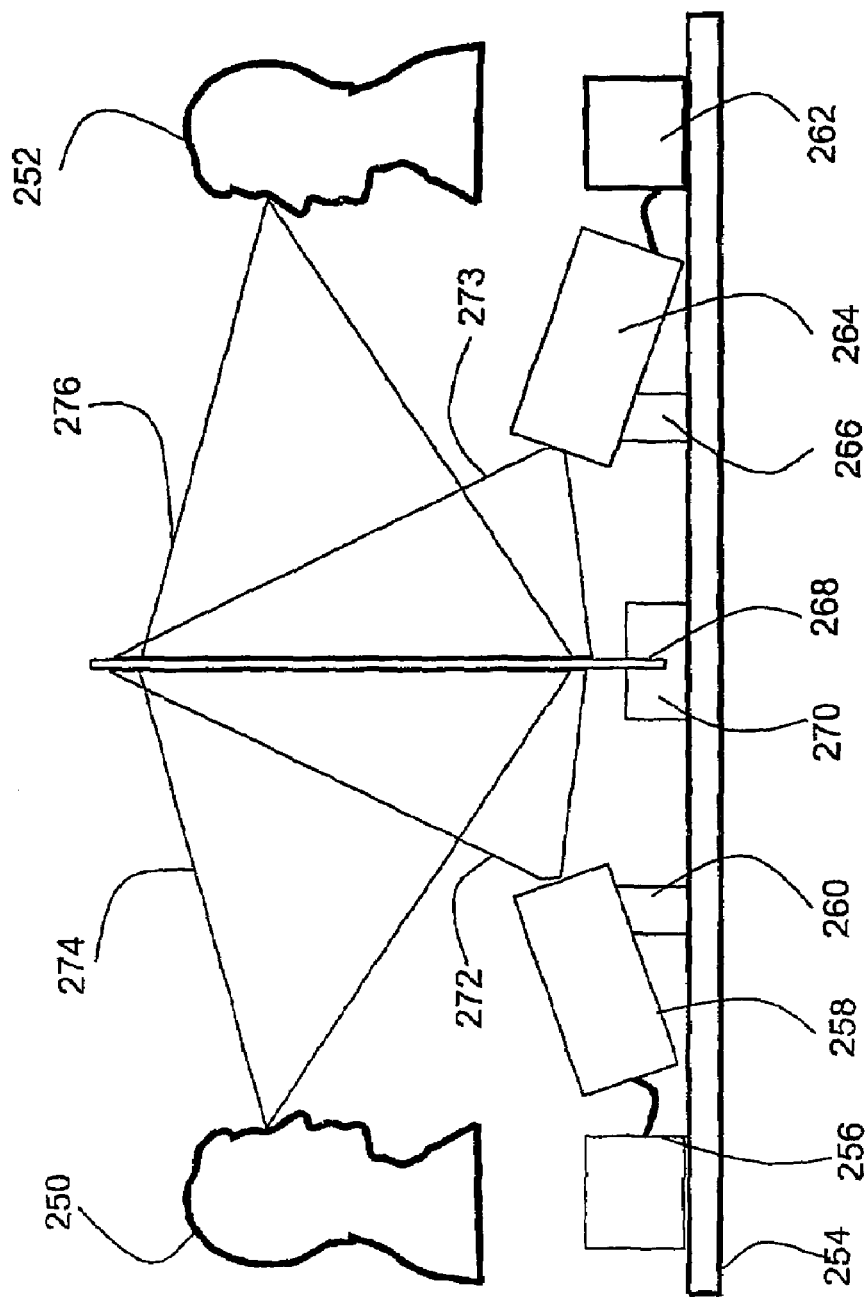

FIG. 11E illustrates the use of the present invention to project the same image onto the opposite sides of a semi-transparent screen to be viewed by two users, while enabling to image on each of the screen surfaces an image intended for private use by the respective user. In this application, at least two persons 250 and 252 communicate face to face with each other around a desk 254, for example for the purpose of a business discussion or for playing a computerized game. Typically, there is a graphical image that accompanies this communication, and both parties need to see it and to contribute to it. Each party would like to keep their own inputs to the joint image in their own custody, for purposes of information security and for easy control. In is example, the person 250 has a micro-projecting device 258 that is associated with a control device 256. The projecting device 258 is supported by a spatial adjustment device 260 to project an image onto a vertical semi-transparent screen 268 located between the two persons and supported by a base 270. The other person 252 uses a similar projecting device 264 held by a support 266 and associated with a control device 262 to project an image onto the vertical screen 268. Two projected beams 272 and 273 impinge onto the opposite faces of the screen 268, and create two different but well registered images. One projector is adjusted to project a mirror image of the data to be imaged, so that both images match each other. Person 250 sees an image, formed by the reflection of the beam 272 superimposed on the translucent beam 273, with a light collection angle 274, while the other person sees the reflected image 273 superimposed on the translucent image 272 with a light collection angle 276. Both persons see the same effective image. Each person can modify graphical information on its own projector, to create visual effects such as relationships between a mine and a tank in a war game, a drawing of a building and a layout of water pipes, a map of a city and the layout of a new proposed residential complex, an X-ray of an anatomic organ and a scheme of a planned operation, etc. Registration marks in identical locations at the margins of the images serve to manually register the two images for exact overlap.

Figure 11F:
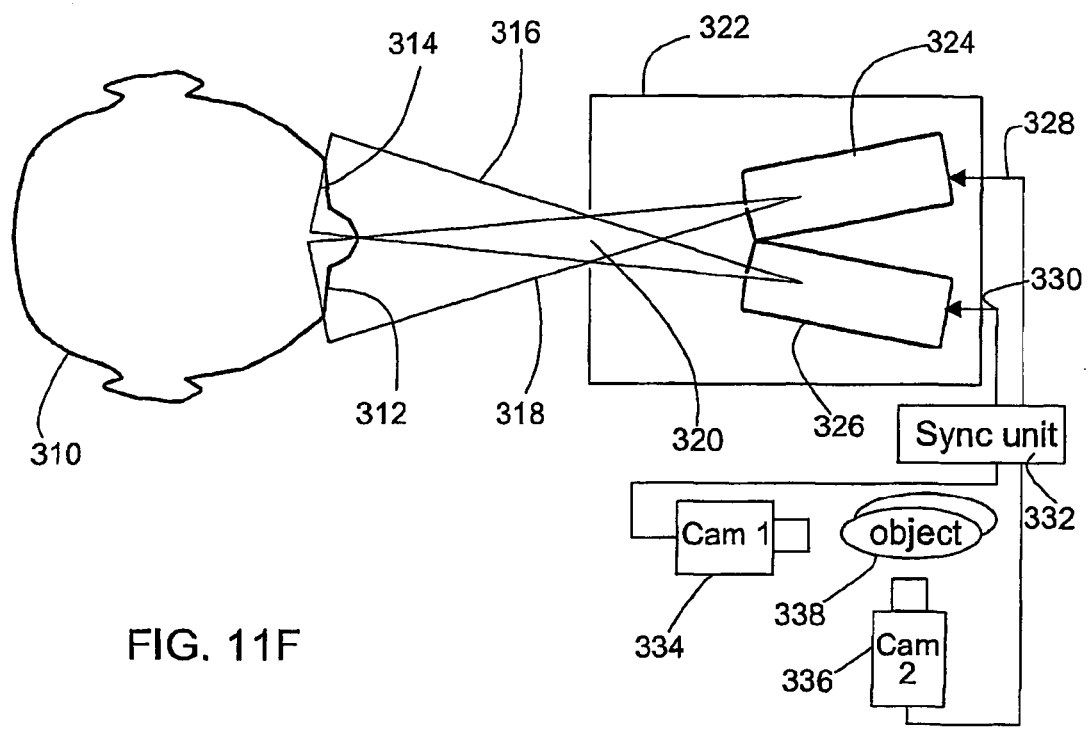
Figure 11G:
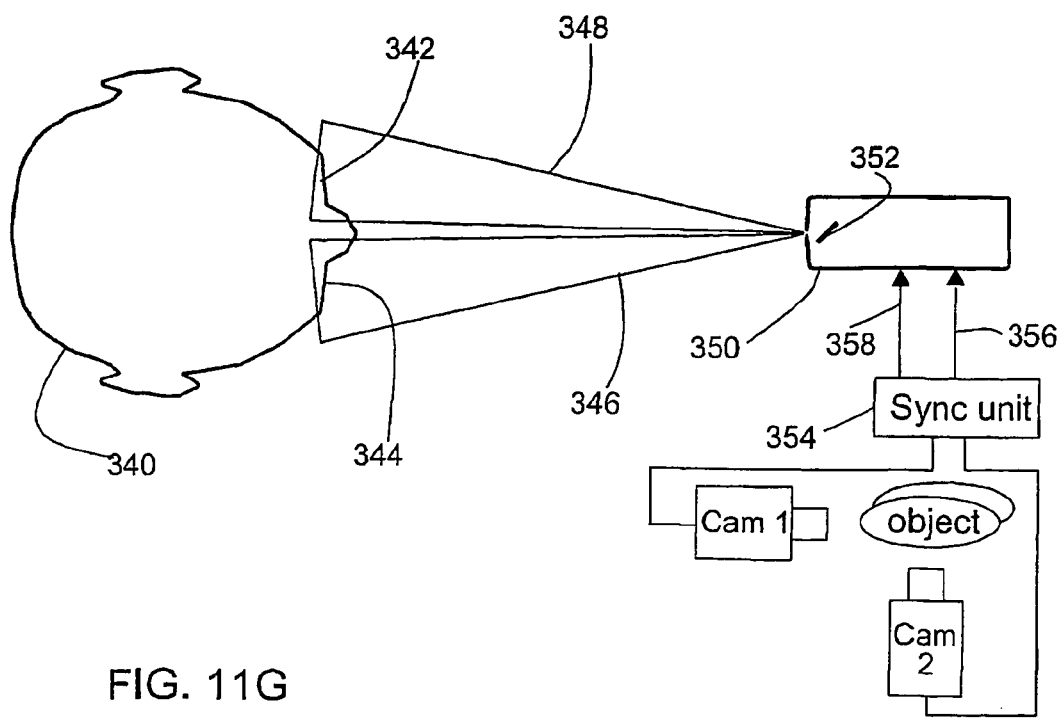

FIGS. 11F and 11G illustrate two examples, respectively, of yet another application of the present invention consisting of projecting stereo images (it can be a non-stereoscopic projection, yet retinal one). The use of the micro-projector based on a spatially coherent light source allows obtaining a directional projection of images which cannot be obtained using the common incoherent projection devices. In the example of FIG. 11F, a user 310 is looking with his bare eyes into an opening 320 of a stereoscopic projector 322. Two coherent projectors of the present invention using laser diodes as their light source 324 and 326 are located inside the stereoscopic projector, each directed into the user's eyes 312 and 314. The user, due to the human process of interpreting the images that both eyes see, conceives the two separated images 316 and 318 to be two projections of a three dimensional object. If the images produced by the two coherent projectors consist of a stereoscopic image, the user will see a three dimensional scene. The scene can be colored and can be dynamic. As shown, two projectors 324 and 326 are connected via two data lines 328 and 330, and are connected to a video input source (processor) 332 that synchronizes the two lines and their video data and determines which part of the data is to be sent to the respective one of the projectors in order to partially have some of the data shared between both of the projectors, but mainly to separate the relevant data to the relevant projector within the unit. Two sources of video data 334 and 336 are two cameras standing and taking shots from different angles of a single object 338 that is then reproduced as a stereoscopic output image. It should be noted that the video sources can be of any kind, and the use of the cameras 334 and 336 only demonstrates a given non-limited example.

Since the laser output is not projected onto a screen but to the user, the use of high optical output power is unnecessary and the optical power used is no more than the optical power which is constantly being used in retinal projection goggles by Microvision Ltd., goggles that are also known to be used in the U.S army.

The importance of using coherent light is associated with the possibility of avoiding light dispersion without the need for controlling this effect, and the possibility of shifting the beam to a desired direction, while any other kind of light would be dispersed.

FIG. 11G shows an alternative implementation of the same concept, wherein a single projector is used. Here, in order to optimize the power consumption, a rotating mirror 352 is used to shift the beam angle and thereby produce the same effect as obtained with the two projectors of FIG. 11F. This configuration saves the use of another projection unit and associated optics, and also saves footprint and weight of the entire system. The user is looking at the projecting device 350 while both beams 348 and 346 are directed to the user's eyes 342 and 344. The rotation of the beam between eye 342 and 344 is carried out by the mirror 352 that continues to rotate in a high rate while the sync unit 354 delivers the required data to each eye to create the 3D stereoscopic effect to the user. Video data is delivered the same way as in the previous example, but only one input video line 356 is connected to the sync unit that controls the input and the rotating mirror with a different control line 358.

Figure 11H:
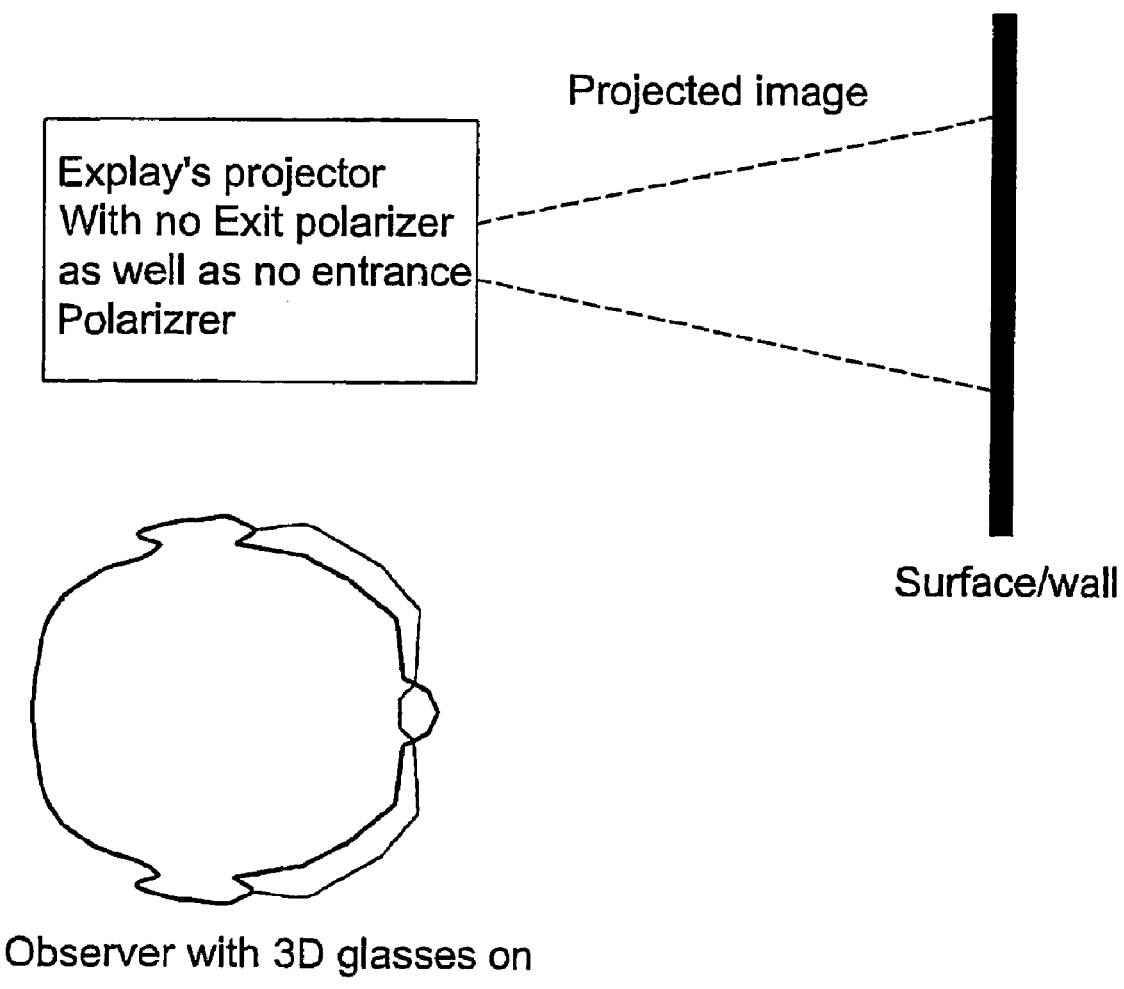

The present invention can be used with wearable stereoscopic 3D glasses to provide a high efficiency 3D projection of images. This concept is schematically illustrated in FIG. 11H. In order to produce a stereoscopic 3D image, it is typically required to have two projection channels operable to provide differences between the two images. In most common systems, wearable glasses are used to maintain the required effect. However, the glasses' lack of transmittance causes the degrading of a large portion of light returned to the observer's eye, resulting in the reduction of brightness and a need for a more powerful projector. Using a DLP projector (Digital light processing projector, which is MEMS technology based) in this specific application, results in a lower efficiency and brightness to the eye of the user as compared to that obtained with an LCD projector, even though that in general, the efficiency on the projected surface itself is higher that that obtained without the 3D glasses. This is due to the fact that the glasses are polarizer based, and since the light coming from an ordinary LCD system is polarized, it passes through the glasses in a more efficient manner without losing as much as if it had come with random polarization, [like from a micro-mirror modulator based projector (a DLP projector)], when being reflected from the projected surface towards the observer glasses.

The technique of the present invention provides for improving the total efficiency more than the both known concepts (Ordinary LCD, DMD/DLP), by simple modification of the projector device of the present invention as exemplified in FIG. 1 or FIG. 6. The modification consists of removing the polarizer in the output side of the SLM unit, thereby having no polarizer at all (considering the use of the polarized light source). Hence, the projection image on the screen surface will not be visible to users who don't wear the glasses and will be shown as a spot of light on the surface. Users who wear the glasses and watch at the image, will see very clearly the images since their glasses function as the polarizer in the output side of the SLM. Consequently, a high brightness, high efficiency image will be obtained on the observer's 3D glasses.

It should be understood that all the functional elements of the device of the present invention as described above in its various implantations can be integrated into a single hybrid component that can become an integral part of a communication and computing device. The invention is suitable to be implemented with multiple light sources in order to produce full color, or by the use of a white light source. The light source can be of any kind, for example a laser diode.

Those skilled in the art will readily appreciate that various modifications and changes can be applied to the embodiments of the invention as hereinbefore exemplified without departing from its scope defined in and by the appended claims.

The invention claimed is:
1. An image projecting device comprising:
a spatial light modulating (SLM) pixel arrangement having a pixel pitch substantially not exceeding 50 µm and defining an active surface;
first and second lens arrays respectively located at opposite surfaces of said SLM pixel arrangement and being integral with said SLM pixel arrangement forming together with said SLM pixel arrangement a common SLM unit, such that each lens in the first array and a respective opposite lens in the second array are associated with a corresponding one of the pixels, each of said first and second lens arrays being implemented in a polymer spacer and each being either spaced from the respective surface of the opposite surfaces of the pixel arrangement a predetermined distance or being in physical contact with said respective surface;

a light source system (LSS) operable to produce an incident light beam of a predetermined cross section corresponding to the size of said active surface; and a magnification optics accommodated at the output side of the SLM pixel arrangement.

2. The device according to claim 1, wherein the distance between the lens array and the respective surface of the SLM pixel arrangement substantially does not exceed 50 μm.

3. An image projecting device comprising:

a spatial light modulating (SLM) pixel arrangement defining an active surface;

first and second lens arrays respectively located at opposite surfaces of said SLM pixel arrangement and being integral with said SLM pixel arrangement, forming together with said SLM pixel arrangement a common SLM unit, such that each lens in the first array and a respective opposite lens in the second array are associated with a corresponding one of the pixels, each of said first and second lens arrays being implemented in a polymer spacer and each being either spaced from the respective surface of the opposite surfaces of the pixel arrangement a distance substantially not exceeding 50 μm or being in physical contact with said respective surface;

a light source system (LSS) operable to produce an incident light beam of a predetermined cross section corresponding to the size of said active surface; and a magnification optics accommodated at the output side of the SLM pixel arrangement.

4. The device according to claim 3, wherein the SLM pixel arrangement comprises light modulating material defining said active surface.

5. The device according to claim 3, wherein the incident light impinging on to the SLM unit is specifically polarized, the device comprising a polarizer unit accommodated at the output side of the SLM pixel arrangement and having a preferred orientation of a plane of polarization so as to be either substantially the same as of the incident light beam or a 90-degree rotated with respect to that of the incident light beam.

6. The device according to claim 5, wherein the light source system includes a high-ratio polarized light source for generating the polarized incident light.

7. The device according to claim 5, comprising an input polarizer at the input side of the SLM pixel arrangement.

8. The device according to claim 5, wherein said polarizer unit is constituted by the surface of wearable glasses capable of imitating a three-dimensional image.

9. The device according to claim 3, wherein the light source system comprises an optical arrangement operable to provide substantially uniform intensity distribution within the cross-section of the incident light beam.

10. The device according to claim 9, wherein said optical arrangement includes a diffractive element operable to modify the beam intensity distribution to produce the substantially uniform intensity distribution of the beam within its cross-section.

11. The device according to claim 3 wherein the light source system includes a beam expander affecting the cross section of a light beam generated by the light source to provide the cross section of the beam substantially of the size of the active surface of the SLM unit.

12. The device according to claim 3, wherein the light source system includes a light source generating a light beam of the cross section substantially of the size of the active surface of the SLM unit.

13. The device according to claim 3, comprising an image processor system operable to carry out at least one of the following: (i) applying digital processing to data indicative of an image to be projected so as to avoid or at least significantly reduce the speckles associated effects in the projected image; (ii) processing data indicative of the projected image to correct for non-uniformities in the light intensity; and (iii) analyzing data indicative of the environmental condition to adjust at least one of the intensity and color mixture of the incident light beam.

14. The device according to claim 13, comprising an image recorder operable to generate the data indicative of the projected image and transmit said data to the image processor system.

15. The device according to claim 13, comprising an environment sensor operable to generate the data indicative of the environment condition and transmit said data to the image processor system.

16. The device according to claim 3, comprising a modulation driver responsive to an imaging signal representative of an image to be projected, to generate modulation signals to the SLM pixel arrangement.

17. The device according to claim 16, wherein said modulation driver is connectable to an image processor system to receive therefrom said imaging signal.

18. The device according to claim 3, comprising a time modulator associated with said SLM pixel arrangement and operable to apply time modulation to different light components of the light source system.

19. The device according to claim 18, wherein said different light components are different color components.

20. The device according to claim 19, wherein said different color components are formed by a combination of highly polarized and non-polarized light.

21. The device according to claim 20, wherein the light source system includes at least one laser source for generating polarized light, and at least one light emitting diode for generating non-polarized light.

22. The device according to claim 3, wherein the light source system generates spatially separated different-color light components, the device comprising additional SLM pixel arrangements, each arrangement being associated with the corresponding one of the color light components.

23. The device according to claim 3, comprising a rotating mirror accommodated in front of a projecting surface, the device thereby enabling creation of a stereoscopic image.

24. A projecting system comprising at least two projecting devices, each constructed according to claim 3.

25. The system according to claim 24, comprising a control unit connectable to each of the projecting devices and operable to enable creation of a large combined image on a projecting surface formed by images created by the projecting devices.

26. The system according to claim 25, wherein said projecting surface is concave.

27. The device according to claim 3, wherein said light source system comprises at least one coherent light source.

28. A computer system operable to generate data to be imaged, the system comprising an image projecting device connected to a data generating utility of the computer system and operating to project the image onto at least one external projecting surface, said image projecting device comprising: a spatial light modulating (SLM) pixel arrangement defining an active surface; first and second lens arrays respectively located at opposite surfaces of said SLM pixel arrangement and being integral with said SLM pixel arrangement forming together with said SLM pixel arrangement a common SLM unit, such that each lens in the first array and a respective opposite lens in the second array are associated with a corresponding one of the pixels, each of said first and second lens arrays being implemented in a polymer spacer and each being either spaced from the respective surface of the opposite surfaces of the pixel arrangement a predetermined distance or being in physical contact with said respective surface; a light source system (LSS) operable to produce an incident light beam of a predetermined cross section corresponding to the size of said active surface; a magnification optics accommodated at the output side of the SLM pixel arrangement.

29. A method for projecting an image comprising:
(i) providing a spatial light modulator (SLM) unit comprising an SLM pixel arrangement having a pixel pitch substantially not exceeding 50 μm and defining an active surface; and first and second lens arrays located at opposite surfaces of said SLM pixel arrangement and being integral with said SLM pixel arrangement, such that each lens in the first array and a respective opposite lens in the second array are associated with a corresponding one of the pixels, each of said first and second lens arrays being implemented in a polymer spacer and being either spaced from the respective surface of the pixel arrangement a predetermined distance or being in physical contact with said respective surface;
(ii) creating an incident light beam having a predetermined cross section corresponding to a size of said active surface defined by the SLM pixel arrangement;
(iii) passing said light through the SLM unit and concurrently operating the SLM pixel arrangement with an imaging signal representative of an image to be projected to thereby produce modulated light;
(iv) passing the modulated light emerging from the SLM unit through a magnifying optics to be projected onto a projecting surface.

30. A method for projecting an image comprising:
(i) providing a spatial light modulator (SLM) unit comprising: a spatial light modulating (SLM) pixel arrangement defining an active surface; and first and second lens arrays located at opposite surfaces of said SLM pixel arrangement and being integral with said SLM pixel arrangement, such that each lens in the first array and a respective opposite lens in the second array are associated with a corresponding one of the pixels, each of said first and second lens arrays being implemented in a polymer spacer and each being either spaced from the respective surface of the opposite surfaces of the SLM pixel arrangement a predetermined distance substantially not exceeding 50 μm or being in physical contact with said respective surface;
(ii) creating an incident light beam having a predetermined cross section corresponding to a size of said active surface defined by the SLM pixel arrangement;
(iii) passing said light through the SLM unit and concurrently operating the SLM pixel arrangement with an imaging signal representative of an image to be projected to thereby produce modulated light;
(iv) passing the modulated light emerging from the SLM unit through a magnifying optics to be projected onto a projecting surface.

31. The method according to claim 30, comprising providing specific polarization of the incident light beam propagating towards the SLM pixel arrangement, and passing the modulated light, propagating towards the projecting surface, through a polarizer having a preferred orientation of a plane of polarization either substantially the same as that of the incident light beam or a 90-degree rotated with respect to that of the incident light beam.

32. The method according to claim 31, comprising passing the randomly polarized light beam generated by a light source through a polarizer accommodated at the input side of the SLM pixel arrangement.

33. The method according to claim 31, wherein the incident light beam is created by a high-ratio polarization light source.

34. The method according to claim 30, wherein the incident light beam is created by a light source emitting a light beam with a cross section substantially of the size of the active surface of the SLM pixel arrangement.

35. The method according to claim 30, wherein the creation of incident light beam comprises passage of a light beam emitted by a light source through a beam shaping optics to thereby produce the incident light beam of the predetermined cross section.

36. The method according to claim 30, wherein the distance between the lens array and the respective surface of the SLM pixel arrangement substantially does not exceed 50 μm.

37. The method according to claim 30, comprising providing specific polarization of the incident light beam propagating towards the SLM pixel arrangement, and passing the modulated light, propagating towards the projecting surface, through a polarizer having a preferred orientation of a plane of polarization either substantially the same as that of the incident light beam or a 90-degree rotated with respect to that of the incident light beam.

38. The method according to claim 37, comprising passing the randomly polarized light beam generated by a light source through a polarizer accommodated at the input side of the SLM pixel arrangement.

39. The method according to claim 37, wherein the incident light beam is created by a high-ratio polarization light source.

40. A method for projecting an image comprising:
(i) providing a spatial light modulator (SLM) unit comprising: a spatial light modulating (SLM) pixel arrangement defining an active surface; and first and second lens arrays respectively located at opposite surfaces of said SLM pixel arrangement and being integral with said SLM pixel arrangement, such that each lens in the first array and a respective opposite lens in the second array are associated with a corresponding one of the pixels, each of said first and second lens arrays being implemented in a polymer spacer and each being either spaced from the respective surface of the opposite surfaces of the SLM pixel arrangement a predetermined distance or being in physical contact with said respective surface;
(ii) creating an incident light beam having a predetermined cross section corresponding to a size of said active surface defined by the SLM pixel arrangement;
(iii) passing said light through the SLM unit and concurrently operating the SLM pixel arrangement with an imaging signal representative of an image to be projected to thereby produce modulated light;
(iv) passing the modulated light emerging from the SLM unit through a magnifying optics to be projected onto a projecting surface;

(v) processing said imaging signal prior to operating thereby the SLM pixel arrangement, to apply digital jittering and gray level processing of pixels, thereby enabling reduction of speckles' effects in the projected image.

41. A method for projecting an image comprising:
(i) providing a spatial light modulator (SLM) unit comprising: a spatial light modulating (SLM) pixel arrangement defining an active surface; and first and second lens arrays respectively located at opposite surfaces of said SLM pixel arrangement and being integral with said SLM pixel arrangement, such that each lens in the first array and a respective opposite lens in the second array are associated with a corresponding one of the pixels, each of said first and second lens arrays being implemented in a polymer spacer and each being either spaced from the respective surface of the opposite surfaces of the SLM pixel arrangement a predetermined distance or being in physical contact with said respective surface;
(ii) creating an incident light beam having a predetermined cross section corresponding to a size of said active surface defined by the SLM pixel arrangement;
(iii) passing said light through the SLM unit and concurrently operating the SLM pixel arrangement with an imaging signal representative of an image to be projected to thereby produce modulated light;
(iv) passing the modulated light emerging from the SLM unit through a magnifying optics to be projected onto a projecting surface;
(v) obtaining data indicative of the projected image, analyzing said data and processing said imaging signal prior to operating thereby the SLM pixel arrangement, to thereby provide substantially uniform intensity within the projected image.

42. A method for projecting an image comprising:
(i) providing a spatial light modulator (SLM) unit comprising: a spatial light modulating (SLM) pixel arrangement defining an active surface; and first and second lens arrays respectively located at opposite surfaces of said SLM pixel arrangement and being integral with said SLM pixel arrangement, such that each lens in the first array and a respective opposite lens in the second array are associated with a corresponding one of the pixels, each of said first and second lens arrays being implemented in a polymer spacer and each being either spaced from the respective surface of the opposite surfaces of the SLM pixel arrangement a predetermined distance or being in physical contact with said respective surface;
(ii) creating an incident light beam having a predetermined cross section corresponding to a size of said active surface defined by the SLM pixel arrangement;
(iii) passing said light through the SLM unit and concurrently operating the SLM pixel arrangement with an imaging signal representative of an image to be projected to thereby produce modulated light;
(iv) passing the modulated light emerging from the SLM unit through a magnifying optics to be projected onto a projecting surface;
(v) obtaining data indicative of an environment condition, analyzing said data, and processing said imaging signal prior to operating thereby the SLM pixel arrangement, to thereby adjust at least one of the intensity and color mixture of the modulated light forming the projected image.

* * * * *